US012544406B2

(12) United States Patent
Carmichael et al.

(10) Patent No.: US 12,544,406 B2
(45) Date of Patent: *Feb. 10, 2026

(54) INDUCED PLURIPOTENT STEM CELL DERIVED GLIAL ENRICHED PROGENITOR CELLS FOR THE TREATMENT OF WHITE MATTER STROKE

(71) Applicant: The Regents of the University of California, Oakland, CA (US)

(72) Inventors: Stanley Thomas Carmichael, Sherman Oaks, CA (US); Irene Lorenzo Llorente, Los Angeles, CA (US); William E. Lowry, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/763,817

(22) PCT Filed: Sep. 27, 2016

(86) PCT No.: PCT/US2016/054007
§ 371 (c)(1),
(2) Date: Mar. 27, 2018

(87) PCT Pub. No.: WO2017/058819
PCT Pub. Date: Apr. 6, 2017

(65) Prior Publication Data
US 2018/0271911 A1 Sep. 27, 2018

Related U.S. Application Data

(60) Provisional application No. 62/236,642, filed on Oct. 2, 2015.

(51) Int. Cl.
| | | |
|---|---|---|
| A61K 35/30 | (2015.01) | |
| A61K 9/00 | (2006.01) | |
| A61K 9/06 | (2006.01) | |
| A61K 35/33 | (2015.01) | |
| A61K 35/545 | (2015.01) | |
| A61K 47/36 | (2006.01) | |
| A61K 47/42 | (2017.01) | |
| A61P 25/00 | (2006.01) | |

(52) U.S. Cl.
CPC ............ *A61K 35/30* (2013.01); *A61K 9/0019* (2013.01); *A61K 9/0085* (2013.01); *A61K 9/06* (2013.01); *A61K 35/33* (2013.01); *A61K 35/545* (2013.01); *A61K 47/36* (2013.01); *A61K 47/42* (2013.01); *A61P 25/00* (2018.01)

(58) Field of Classification Search
None
See application file for complete search history.

(56) References Cited

U.S. PATENT DOCUMENTS

2022/0241345 A1 8/2022 Carmichael et al.

FOREIGN PATENT DOCUMENTS

| WO | WO 99/08533 A1 | 2/1999 | |
|---|---|---|---|
| WO | WO-2009137674 A2 * | 11/2009 | ........... C12N 5/0622 |
| WO | 2012121971 A2 | 3/2012 | |
| WO | 2014022423 A2 | 7/2012 | |
| WO | WO 2014/124087 A1 | 8/2014 | |
| WO | WO 2017/058819 A1 | 4/2017 | |

OTHER PUBLICATIONS

Goldman et al Science, 338,491-495 (Year: 2012).*
Li et al Experimental Neurology 271, 479-492 (Year: 2015).*
Yu et al, Science , 21;318(5858): 1917-20 (Year: 2007).*
Goldman et al Science, 228, 6106, 491-495 (Year: 2012).*
Sozman et al Journal of Neuroscience Methods 180 261-272 (Year: 2009).*
Wang et al Pharm Res 28:1406-1414 (Year: 2011).*
Zhong et al. Neurorehabilitation and Neural Repair 24:636-644 (Year: 2010).*
Hinman et al. Stroke 44(1): 182-189 (Year: 2013).*
Xie et al. Stem Cell Reports 3: 743-757)/ (Year: 2014).*
Santilli et al PLoS One, 5, 1, e8575, 1-12 (Year: 2010).*
Patterson et al (Cell Research 22:178-193 (Year: 2012).*
Clemente et al Front. Cell. Neurosci. 7, 268 , 1-15 (Year: 2013).*
Barker et al The Journal of Neuroscience, 20(9): 3415-3424 (Year: 2000).*
Armstrong et al Neuroscience, 106(1): 201-216 (Year: 2001).*
Loseva et al Brain Research, 915: 125-132 (Year: 2001).*
Tomov et al Neural Regen Res 15(7):1173-1178 (Year: 2020).*
Bjorklund et al Nature Neuroscience, 3(6): 537-544 (Year: 2000).*
Dobkin et al Neurorehabilitation and Neural Repair , vol. 30(5) 470-478 (Year: 2016).*
R& D system Publication (Neural Stem Cell & Differentiation marker 1-5 (Year: 2011).*
Liu et al Frontiers in Cellular Neuroscience, 15, 1-10 (Year: 2021).*
Llorente et al Sci. Transl. Med. 13, eaaz6747, 1-17 (Year: 2021).*
Jiang et al Nature communication, 3, 1-16 (Year: 2013).*
Seo et al (S. Baltan et al. (eds.), White Matter Injury in Stroke and CNS Disease, Springer Series in Translational Stroke Research 4, 197-216 (Year: 2014).*
Otero-Ortega et al Stem Cell Research & Therapy , 6:121, 1012 (Year: 2015).*
PCT International Search Report and Written Opinion dated Jan. 6, 2017 issued in PCT/US2016/054007.
PCT International Preliminary Report on Patentability dated Apr. 3, 2018 issued in PCT/US2016/054007.
EP Extended European Search Report dated Feb. 22, 2019 issued in EP16852426.2.

(Continued)

*Primary Examiner* — Anoop K Singh
(74) *Attorney, Agent, or Firm* — Norton Rose Fulbright US LLP

(57) ABSTRACT

In various embodiments methods and compositions for improving a recovery of a subject after a cerebral ischemic injury, such as white matter stroke are provided. In certain embodiments, the methods involve administering human induced pluripotent glial enriched progenitor cells into the brain of the subject.

3 Claims, 14 Drawing Sheets

(56) References Cited

OTHER PUBLICATIONS

Ahmad er al., (2015) "Optimization of a clinically relevant model of white matter stroke in mice: histological and functional evidences", *Journal of Neurology and Neurosurgery*, 2(2): Article No. 21000114 (7 pages) (Epub. Aug. 20, 2015).
Han et al., (2013) "Forebrain Engraftment by Human Glial Progenitor Cells Enhances Synaptic Plasticity and Learning in Adult Mice", *Cell Stem Cell*, 12(3): 342-353.
Li et al., (2015) "CXCL12 gene therapy ameliorates ischemia-induced white matter injury in mouse brain", *Stem Cells Translational Medicine*, 4(10): 1122-1130 (Epub. Aug. 7, 2015).
Otero-Ortega et al., (2015) "White matter injury restoration after stem cell administration in subcortical ischemic stroke", *Stem Cell Research & Therapy*, 6(121): 1-12 (Epub. Jun. 19, 2015).
Sozmen et al., (2009) "A white matter stroke model in the mouse: axonal damage, progenitor responses and MRI correlates", *Journal of Neuroscience Methods*, 180(2): 261-272 (Epub. Mar. 31, 2009).
Windrem et al., (2008) "Neonatal Chimerization with Human Glial Progenitor Cells Can Both Remyelinate and Rescue the Otherwise Lethally Hypomyelinated Shiverer Mouse", *Cell Stem Cell*, 2(6): 553-565.
Xie et al., (2014) "Defining the Role of Oxygen Tension in Human Neural Progenitor Fates", *Stem Cell Reports*, 3(5): 743-757.
EP Office Action dated Dec. 6, 2019 issued in EP16852426.2.
JP Office Action dated Oct. 19, 2020 issued in JP 2018-516741.
JP Office Action (Final) dated Sep. 6, 2021 issued in JP 2018-516741.
Llorente et al., (2021) "Patient-derived glial enriched progenitors repair functional deficits due to white matter stroke and vascular dementia in rodents", Sci. Transl. Med., 13: eaaz6747 (18 pages) DOI: 10.1126/scitranslmed.aaz6747.
U.S. Appl. No. 17/674,708, inventors Carmichael S.T., et al., filed on Feb. 17, 2022.
JP Office Action dated Sep. 12, 2022, in Application No. JP2018-516741.
Milosevic, J. et al., "Non-hypoxic stabilization of hypoxia-inducible factor alpha (HIF-α): relevance in neural progenitor/stem cells", May 2009, vol. 15, No. 4, pp. 367-380.
U.S. Restriction requirement dated Jul. 19, 2023, in U.S. Appl. No. 17/674,708.
Caplan H et al., Mesenchymal Stromal Cell Therapeutic Delivery: Translational Challenges to Clinical Application. *Front Immunol*, 10:1645, 2019.
Duan R et al. Induced Pluripotent Stem Cells for Ischemic Stroke Treatment. *Front Neurosci*, 15:628663. 2021.
Keller A et al., Genetic and epigenetic factors which modulate differentiation propensity in human pluripotent stem cells. *Hum Reprod Update*, 24(2):162-175, 2018.
Sheikh A ret al., Advances in stem cell therapy for stroke: mechanisms, challenges, and future directions. *Regenerative Medicine Reports*, 1(1):76-92, 2024.
Strano A et al., Variable Outcomes in Neural Differentiation of Human PSCs Arise from Intrinsic Differences in Developmental Signaling Pathways. *Cell Rep.*, 31(10):107732, 2020.

\* cited by examiner

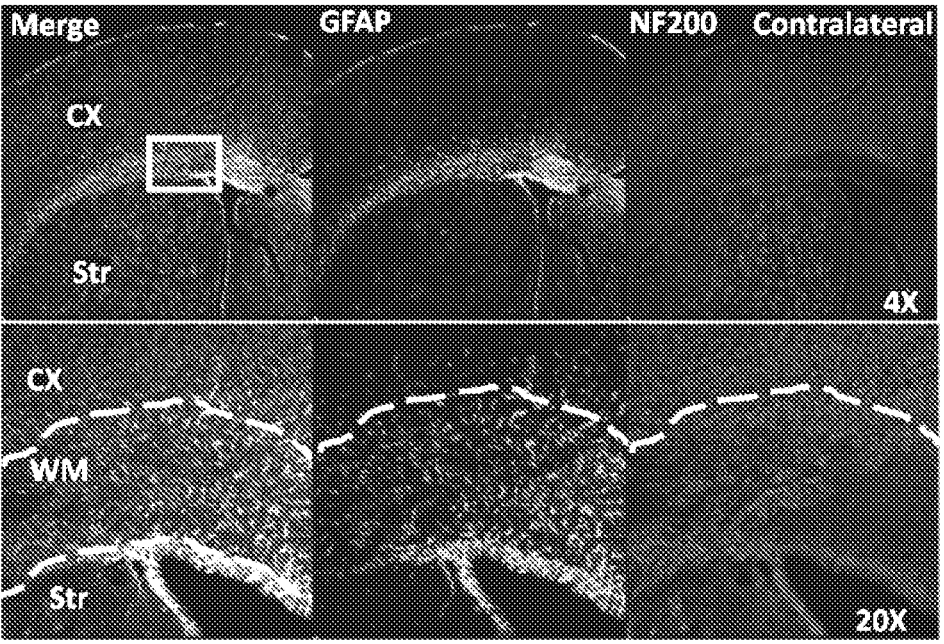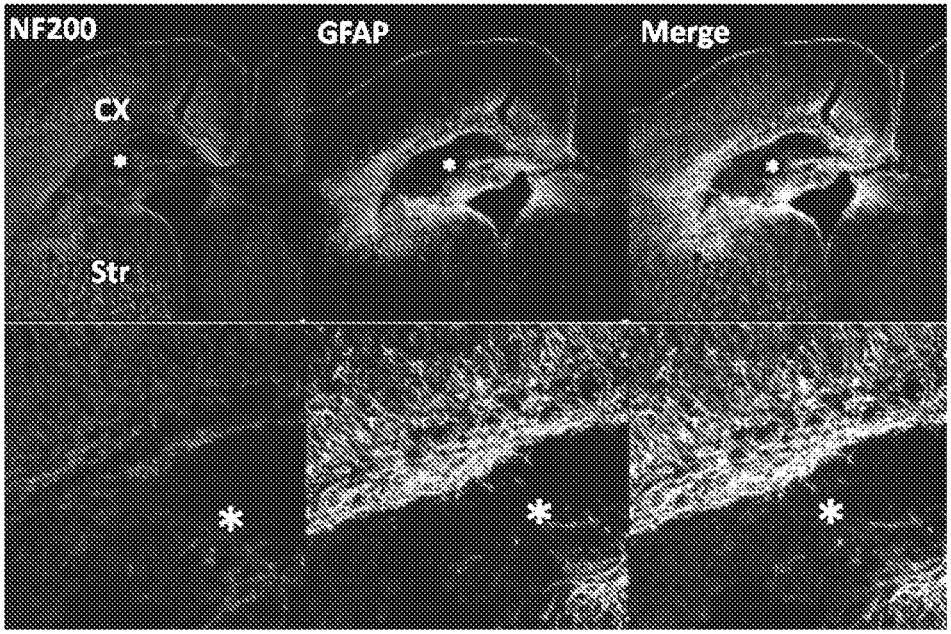
Fig. 3

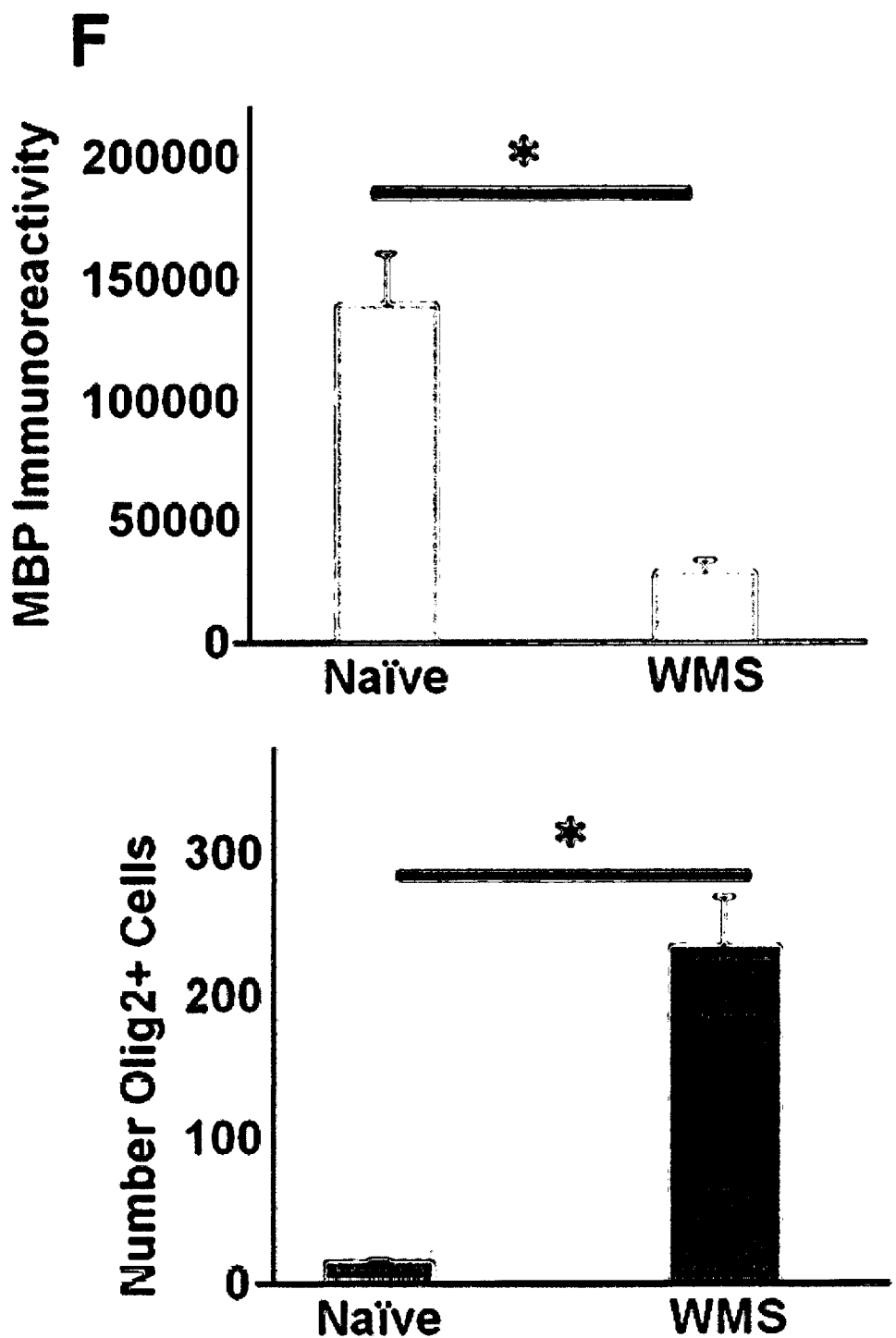
Fig. 4, cont'd.

In Vivo Brain Imaging of Stroke "Repair"
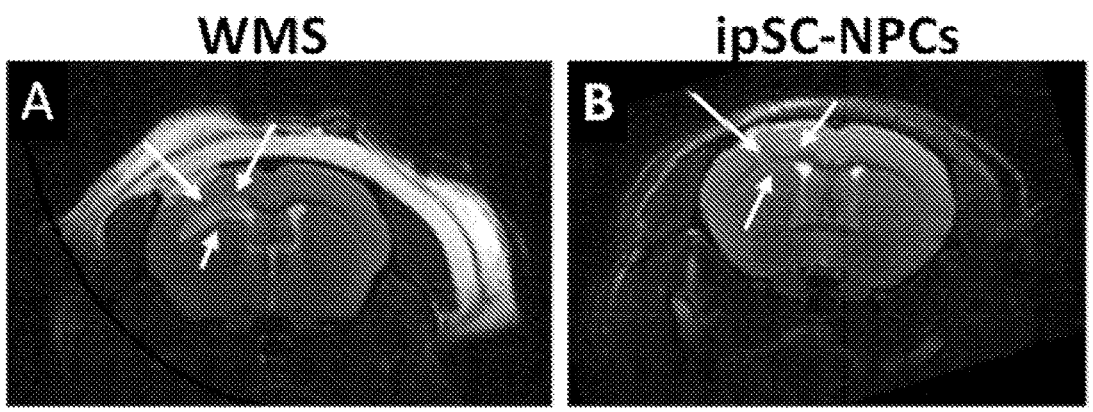
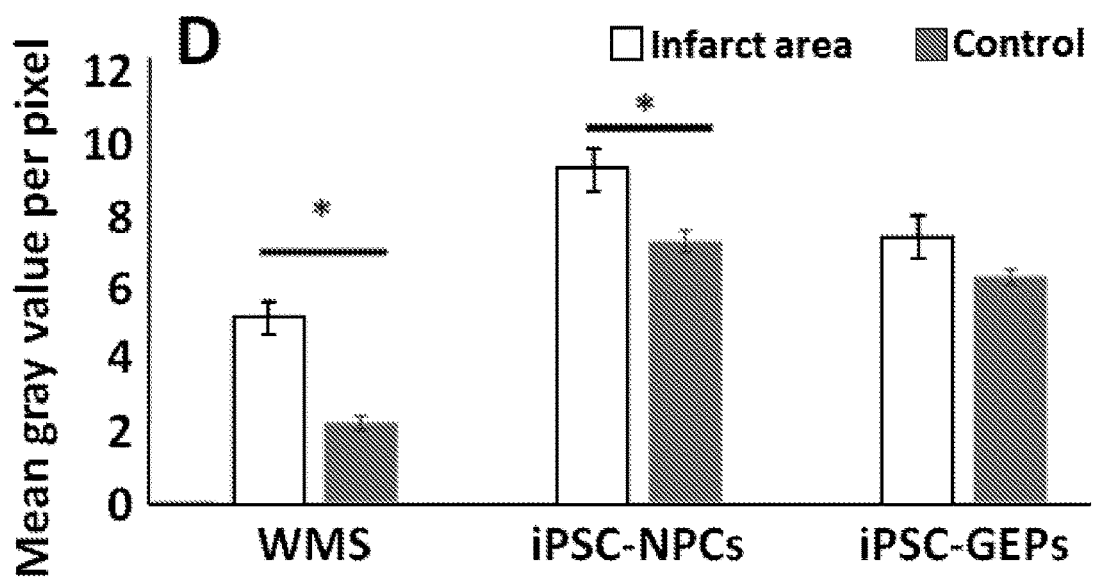
*Fig. 7*

INDUCED PLURIPOTENT STEM CELL DERIVED GLIAL ENRICHED PROGENITOR CELLS FOR THE TREATMENT OF WHITE MATTER STROKE

CROSS-REFERENCE TO RELATED APPLICATIONS

This application is a U.S. 371 National phase of PCT/US2016/054007, filed on Sep. 27, 2016, which claims benefit of and priority to U.S. Ser. No. 62/236,642, filed on Oct. 2, 2015, both of which are incorporated herein by reference in their entirety for all purposes.

STATEMENT OF GOVERNMENTAL SUPPORT

[Not Applicable]

BACKGROUND

Subcortical white matter stroke (WMS) constitutes up to 25% of the 795,000 new strokes occurring annually in the U.S. (de Leeuw et al. (2001) *J. Neural Neurosurg. Psychiatry,* 70: 9; Schneider et al. (2004) *Stroke,* 35: 1552; Ladecola (2013) *Neuron* 80: 844). During the normal human aging process, the white matter regions of the brain suffer progressive damage related to both overt and clinically silent ischemia. This type of ischemia is often termed "small vessel disease" as it occurs without occlusion of large cerebral arteries, and can occur without the clinical symptoms typical of stroke damage (Gorelick et al. (2011) *Stroke* 42(9): 2672). Cerebral white matter lesions indicative of WMS are detected on brain imaging in asymptomatic individuals who have not suffered a stroke (Debette and Markus, (2010) *Br. Med. J.* 341: c3666), and accumulate with age such that they are present in virtually all individuals over the age of 80 (de Leeuw et al. (2001) *J. Neural Neurosurg. Psychiatry* 70: 9). The degree of white matter injury closely correlates with abnormalities in cognition, balance and gait and carries an increased risk of death (Zheng et al. (2011) *Stroke,* 42: 2086; Debette and Markus, (2010) *Br. Med. J.* 341: c3666). This progressive accumulation of ischemic white matter injury is a subtype of stroke that is the second leading cause of dementia and interacts with Alzheimer's disease to worsen and possibly accelerate this illness (Gorelick et al. (2011) *Stroke* 42(9): 2672; DeCarli et al. (2013) *J. Alzheimers Dis.* 33 (Suppl 1): S417).

WMS has a very different pattern of cellular injury that occurs in large artery stroke or that pattern of cellular injury seen in traditional animal stroke models. The neural elements damaged in WMS include oligodendrocytes, oligodendrocyte progenitor cells (OPCs), astrocytes and axons. The major neural cell types in the white matter are thus glial cells: oligodendrocytes, OPCs and astrocytes. In large artery stroke, the major cell type that experiences ischemia is the neuron Oligodendrocytes and OPCs are in a lineage that myelinate the brain's white matter regions (Richardson et al. (2011) *Neuron* 70(4): 661). Myelination is a critical insulation feature of axons and allows fast signaling and protects axons from cell death (Fancy et al. (2010) *Exp. Neurol,* 225: 18). Astrocytes promote OPC survival and differentiation into the myelinating oligodendrocytes (Patel et al. (2012) *Acta Neuropathol.* 124: 847; Stoffels et al. (2015) *Glia* 63:2 42) and indicate that glial-glial signaling within white matter plays a role in normal white matter function and in diseases such as multiple sclerosis (Clemente et al. (2013) *Front Cell Neurosci.* 7: 268). Cerebral white matter lesions are confluent and extensive in WMS. Currently, there are no therapies available for white matter stroke.

SUMMARY

In various embodiments described herein, methods are provided, inter alia, for treating a subject after a cerebral ischemic injury and/or after neural demyelination. In some embodiments the cerebral ischemic injury is white matter subcortical stroke. In certain embodiments, the subject is a human. In various embodiments the methods generally involve administering a therapeutically effective amount of human induced pluripotent glial-enriched progenitor into the brain of the subject. In some embodiments, the methods comprise administering the human induced pluripotent glial-enriched progenitor cells into the infarct core. In certain embodiments, the methods comprise additionally or alternatively comprise administering the human embryonic stem-cell derived oligodendrocyte progenitor cells directly adjacent to the infarct core.

In certain embodiments, the human induced pluripotent glial-enriched progenitor are administered during the subacute time period after an ischemic injury. In some embodiments, the human induced pluripotent glial-enriched progenitor cells are administered during the early subacute time period after the ischemic injury. In certain embodiments, the human induced pluripotent glial-enriched progenitor are administered during the late subacute time period.

In certain embodiments, methods for improving motor and/or cognitive function and/or speech of a subject after a cerebral ischemic injury are provided where the methods comprise administering a therapeutically effective amount of human induced pluripotent glial-enriched progenitor into and/or directly adjacent to the infarct core in the brain of said subject. In some embodiments the cerebral ischemic injury is white matter subcortical stroke. In certain embodiments, the subject is a human. In some embodiments, the method comprises administering the human induced pluripotent glial-enriched progenitor into the infarct core. In other embodiments, the method comprises administering the human induced pluripotent glial-enriched progenitor cells j directly adjacent to the infarct core. In yet other embodiments, the invention provides a pharmaceutical composition for the treatment of subcortical while j matter stroke, comprising human induced pluripotent glial-enriched progenitors.

Various embodiments contemplated herein may comprise, but need not be limited to, one or more of the following:

Embodiment 1

A method of improving recovery of a mammal after a cerebral ischemic injury, said method comprising administering a therapeutically effective amount of induced pluripotent glial-enriched progenitor cells (iPSC-GEPs) (e.g., defined by expression of astrocyte markers), into or adjacent to the infarct core in the brain of said mammal.

Embodiment 2

The method of embodiment 1, wherein the cerebral ischemic injury is subcortical white matter stroke.

Embodiment 3

The method of embodiment 1, wherein the cerebral ischemic injury is vascular dementia.

Embodiment 4

The method according to any one of embodiments 1-3, wherein the subject is a human.

Embodiment 5

The method according to any one of embodiments 1-4, wherein said progenitor cells are human induced pluripotent glial-enriched progenitor cells.

Embodiment 6

The method according to any one of embodiments 1-5, wherein said progenitor cells are administered directly to the infarct core.

Embodiment 7

The method according to any one of embodiments 1-5, wherein said progenitor cells are administered into the subcortical white matter outside of the infarct core.

Embodiment 8

The method according to any one of embodiments 1-7, wherein said progenitor cells are administered during the subacute time period after the ischemic injury.

Embodiment 9

The method according to any one of embodiments 1-8, wherein said progenitor cells are administered via an injection or cannula.

Embodiment 10

The method of embodiment 9, wherein said progenitor cells are contained in a buffer.

Embodiment 11

The method according to any one of embodiments 1-8, wherein said progenitor cells are administered using a depot delivery system.

Embodiment 12

The method of embodiment 11, wherein the depot delivery system comprises a hydrogel (e.g., an injectable hydrogel).

Embodiment 13

The method of embodiment 12, wherein said hydrogel comprises a biopolymer.

Embodiment 14

The method of embodiment 13, wherein said hydrogel comprises one or more materials selected from the group consisting of hyaluronan, gelatin, thiol-modified hyaluronan, heparin, thiol-modified heparin, thiol-modified chondroitin sulfate, thiol-modified gelatin, a hyaluronan sodium salt, and an acrylated hyaluronic acid.

Embodiment 15

The method according to any one of embodiments 12-14, wherein said hydrogel comprises a hyaluronan derivative and a gelatin derivative.

Embodiment 16

The method of embodiment 15, wherein hyaluronan derivative comprises a thiolated hyaluronan.

Embodiment 17

The method according to any one of embodiments 15-16, wherein said gelatin derivative comprises a thiolated gelatin.

Embodiment 18

The method according to any one of embodiments 16-17, wherein said thiolated hyaluronan and thiolated gelatin are have each been thiol-modified using carbodiimide mediated hydrazide chemistry.

Embodiment 19

The method according to any one of embodiments 15-18, wherein said thiol-modified derivatives of hyaluronan and gelatin are crosslinked to form a hydrogel.

Embodiment 20

The method of embodiment 19, wherein said derivatives of hyaluronan and gelatin are crosslinked with a divalent or polyvalent electrophile.

Embodiment 21

The method of embodiment 20, wherein said derivatives of hyaluronan and gelatin are crosslinked with a reagent selected from the group consisting of a polyethylene glycol diacrylate (PEGDA), a polyethylene glycol divinyl sulfone, a polyethylene glycol bismaleimide, a polyethylene glycol dimethyacrylate, a polyethylene glycol (methyl)acrylamide, and a polyethylene glycol di(halo)acetate.

Embodiment 22

The method of embodiment 19, wherein said wherein said derivatives of hyaluronan and gelatin are crosslinked with a polyethylene glycol diacrylate (PEGDA).

Embodiment 23

The method according to any one of embodiments 12-22, wherein said hydrogel comprises a heparin or a heparin derivative.

Embodiment 24

The method of embodiment 23, wherein said heparin derivative is a thiol-modified heparin.

Embodiment 25

The method of embodiment 24, wherein said heparin derivative is linked to said hyaluronan derivative and/or to said gelatin derivative.

Embodiment 26

The method of embodiment 25, wherein heparin derivative is linked to said hyaluronan derivative and/or to said gelatin derivative with a divalent or polyvalent electrophile.

Embodiment 27

The method of embodiment 26, wherein heparin derivative is linked to said hyaluronan derivative and/or to said gelatin derivative with a reagent selected from the group consisting of a polyethylene glycol diacrylate (PEGDA), a polyethylene glycol divinyl sulfone, a polyethylene glycol bismaleimide, a polyethylene glycol dimethyacrylate, a polyethylene glycol (methyl)acrylamide, and a polyethylene glycol di(halo)acetate.

Embodiment 28

The method of embodiment 25, wherein heparin derivative is linked to said hyaluronan derivative and/or to said gelatin derivative with a polyethylene glycol diacrylate (PEGDA).

Embodiment 29

The method according to any one of embodiments 12-28, wherein said hydrogel comprises at most about 10% solids w/v.

Embodiment 30

The method according to any one of embodiments 12-28, wherein said hydrogel comprises at most about 5% solids w/v.

Embodiment 31

The method according to any one of embodiments 12-28, wherein said hydrogel comprises at most about 3% solids w/v.

Embodiment 32

The method according to any one of embodiments 1-31, wherein said progenitor cells are derived from fibroblasts.

Embodiment 33

The method of embodiment 32, wherein said progenitor cells are derived from dermal fibroblasts.

Embodiment 34

The method of embodiment 33, wherein said progenitor cells are derived from neonatal dermal fibroblasts.

Embodiment 35

The method according to any one of embodiments 1-31, wherein said progenitor cells are derived from epithelia cells.

Embodiment 36

The method of embodiment 35, wherein said progenitor cells are derived from renal epithelia cells.

Embodiment 37

The method according to any one of embodiments 1-36, wherein said cerebral ischemic injury is due to a stroke.

Embodiment 38

The method according to any one of embodiments 1-36, wherein said cerebral ischemic injury is due to a head injury.

Embodiment 39

The method according to any one of embodiments 1-36, wherein said cerebral ischemic injury is due to a respiratory failure.

Embodiment 40

The method according to any one of embodiments 1-36, wherein said cerebral ischemic injury is due to a cardiac arrest.

Embodiment 41

A method for improving motor or cognitive function of a subject after a cerebral ischemic injury, said method including administering a therapeutically effective amount of induced pluripotent glial-enriched progenitor cells into or adjacent to the infarct core in the brain of said mammal.

Embodiment 42

The method of embodiment 41, wherein the cerebral ischemic injury is subcortical white matter stroke.

Embodiment 43

The method of embodiment 41, wherein the cerebral ischemic injury is an arterial stroke.

Embodiment 44

The method of embodiment 41, wherein the cerebral ischemic injury is vascular dementia.

Embodiment 45

The method according to any one of embodiments 41-44, wherein the subject is a human.

Embodiment 46

The method according to any one of embodiments 41-45, wherein said progenitor cells are human induced pluripotent glial-enriched progenitor cells.

Embodiment 47

The method according to any one of embodiments 41-46, wherein said progenitor cells are administered directly to the infarct core.

Embodiment 48

The method according to any one of embodiments 41-46, wherein said progenitor cells are administered into the infarct core.

Embodiment 49

The method according to any one of embodiments 41-48, wherein said progenitor cells are administered during the subacute time period after the ischemic injury.

Embodiment 50

The method according to any one of embodiments 41-49, wherein said progenitor cells are administered using a depot delivery system.

Embodiment 51

The method according to any one of embodiments 41-49, wherein said progenitor cells are administered via an injection or canula.

Embodiment 52

The method of embodiment 51, wherein said progenitor cells are contained in a buffer.

Embodiment 53

The method of embodiment 50, wherein the depot delivery system comprises a hydrogel.

Embodiment 54

The method of embodiment 53, wherein said hydrogel comprises a biopolymer.

Embodiment 55

The method of embodiment 54, wherein said hydrogel comprises one or more materials selected from the group consisting of hyaluronan, gelatin, thiol-modified hyaluronan, heparin, thiol-modified heparin, thiol-modified chondroitin sulfate, thiol-modified gelatin, a hyaluronan sodium salt, and an acrylated hyaluronic acid.

Embodiment 56

The method according to any one of embodiments 53-55, wherein said hydrogel comprises a hyaluronan derivative and a gelatin derivative.

Embodiment 57

The method of embodiment 56, wherein hyaluronan derivative comprises a thiolated hyaluronan.

Embodiment 58

The method according to any one of embodiments 56-57, wherein said gelatin derivative comprises a thiolated gelatin.

Embodiment 59

The method according to any one of embodiments 57-58, wherein said thiolated hyaluronan and thiolated gelatin are have each been thiol-modified using carbodiimide mediated hydrazide chemistry.

Embodiment 60

The method according to any one of embodiments 56-59, wherein said thiol-modified derivatives of hyaluronan and gelatin are crosslinked to form a hydrogel.

Embodiment 61

The method of embodiment 60, wherein said derivatives of hyaluronan and gelatin are crosslinked with a divalent or polyvalent electrophile.

Embodiment 62

The method of embodiment 61 wherein said derivatives of hyaluronan and gelatin are crosslinked with a reagent selected from the group consisting of a polyethylene glycol diacrylate (PEGDA), a polyethylene glycol divinyl sulfone, a polyethylene glycol bismaleimide, a polyethylene glycol dimethyacrylate, a polyethylene glycol (methyl)acrylamide, and a polyethylene glycol di(halo)acetate.

Embodiment 63

The method of embodiment 60, wherein said wherein said derivatives of hyaluronan and gelatin are crosslinked with a polyethylene glycol diacrylate (PEGDA).

Embodiment 64

The method according to any one of embodiments 53-63, wherein said hydrogel comprises a heparin or a heparin derivative.

Embodiment 65

The method of embodiment 64, wherein said heparin derivative is a thiol-modified heparin.

Embodiment 66

The method of embodiment 65, wherein said heparin derivative is linked to said hyaluronan derivative and/or to said gelatin derivative.

Embodiment 67

The method of embodiment 66, wherein heparin derivative is linked to said hyaluronan derivative and/or to said gelatin derivative with a divalent or polyvalent electrophile.

Embodiment 68

The method of embodiment 67, wherein heparin derivative is linked to said hyaluronan derivative and/or to said gelatin derivative with a reagent selected from the group consisting of a polyethylene glycol diacrylate (PEGDA), a polyethylene glycol divinyl sulfone, a polyethylene glycol bismaleimide, a polyethylene glycol dimethyacrylate, a polyethylene glycol (methyl)acrylamide, and a polyethylene glycol di(halo)acetate.

Embodiment 69

The method of embodiment 66, wherein heparin derivative is linked to said hyaluronan derivative and/or to said gelatin derivative with a polyethylene glycol diacrylate (PEGDA).

Embodiment 70

The method according to any one of embodiments 53-69, wherein said hydrogel comprises at most about 10% solids w/v.

Embodiment 71

The method according to any one of embodiments 53-69, wherein said hydrogel comprises at most about 5% solids w/v.

Embodiment 72

The method according to any one of embodiments 53-69, wherein said hydrogel comprises at most about 3% solids w/v.

Embodiment 73

The method according to any one of embodiments 41-72, wherein said progenitor cells are derived from fibroblasts.

Embodiment 74

The method of embodiment 73, wherein said progenitor cells are derived from dermal fibroblasts.

Embodiment 75

The method of embodiment 74, wherein said progenitor cells are derived from neonatal dermal fibroblasts.

Embodiment 76

The method according to any one of embodiments 41-72, wherein said progenitor cells are derived from epithelia cells.

Embodiment 77

The method of embodiment 76, wherein said progenitor cells are derived from renal epithelia cells.

Embodiment 78

The method according to any one of embodiments 41-77, wherein said cerebral ischemic injury is due to a stroke.

Embodiment 79

The method according to any one of embodiments 41-77, wherein said cerebral ischemic injury is due to a traumatic injury.

Embodiment 80

The method of embodiment 79, wherein said traumatic injury comprises a head and/or spinal cord injury.

Embodiment 81

The method according to any one of embodiments 41-77, wherein said cerebral ischemic injury is due to a condition selected from the group consisting of multiple sclerosis, the leukodystrophies, the Guillain-Barre Syndrome, the Charcot-Marie-Tooth neuropathy, Tay-Sachs disease, Niemann-Pick disease, Gaucher disease, and Hurler syndrome.

Embodiment 82

The method according to any one of embodiments 41-77, wherein said cerebral ischemic injury is due to a cardiac arrest.

Embodiment 83

The method according to any one of embodiments 41-77, wherein said cerebral ischemic injury is due to a respiratory failure.

Embodiment 84

A method of slowing myelin loss, and/or promoting myelin repair, and/or promoting remyelination in a mammal having a demyelinating pathology that effects the central nervous system, said method including administering a therapeutically effective amount of induced pluripotent glial-enriched progenitor cells into or adjacent to the infarct core in the brain of said mammal.

Embodiment 85

The method of embodiment 84, wherein said pathology is selected from the group consisting of multiple sclerosis, an inflammatory demyelinating disease (such as Multiple Sclerosis), a leukodystrophic disorder, a CNS neuropathy, central pontine myelinolysis, a myelopathy, a leukoencephalopathy, and a leukodystrophy.

Embodiment 86

The method according to any one of embodiments 84-85, wherein the subject is a human.

Embodiment 87

The method according to any one of embodiments 84-86, wherein said progenitor cells are human induced pluripotent glial-enriched progenitor cells.

Embodiment 88

The method according to any one of embodiments 84-87, wherein said progenitor cells are administered directly to the infarct core.

Embodiment 89

The method according to any one of embodiments 84-87, wherein said progenitor cells are administered into the subcortical white matter outside of t the infarct core.

Embodiment 90

The method according to any one of embodiments 84-89, wherein said progenitor cells are administered during the subacute time period after the ischemic injury.

Embodiment 91

The method according to any one of embodiments 84-90, wherein said progenitor cells are administered using a depot delivery system.

Embodiment 92

The method of embodiment 91, wherein the depot delivery system comprises a hydrogel.

Embodiment 93

The method of embodiment 92, wherein said hydrogel comprises a biopolymer.

Embodiment 94

The method of embodiment 93, wherein said hydrogel comprises one or more materials selected from the group consisting of hyaluronan, gelatin, thiol-modified hyaluronan, heparin, thiol-modified heparin, thiol-modified chondroitin sulfate, thiol-modified gelatin, a hyaluronan sodium salt, and an acrylated hyaluronic acid.

Embodiment 95

The method according to any one of embodiments 92-94, wherein said hydrogel comprises a hyaluronan derivative and a gelatin derivative.

Embodiment 96

The method of embodiment 95, wherein hyaluronan derivative comprises a thiolated hyaluronan.

Embodiment 97

The method according to any one of embodiments 95-96, wherein said gelatin derivative comprises a thiolated gelatin.

Embodiment 98

The method according to any one of embodiments 96-97, wherein said thiolated hyaluronan and thiolated gelatin are have each been thiol-modified using carbodiimide mediated hydrazide chemistry.

Embodiment 99

The method according to any one of embodiments 95-98, wherein said thiol-modified derivatives of hyaluronan and gelatin are crosslinked to form a hydrogel.

Embodiment 100

The method of embodiment 99, wherein said derivatives of hyaluronan and gelatin are crosslinked with a divalent or polyvalent electrophile.

Embodiment 101

The method of embodiment 100, wherein said derivatives of hyaluronan and gelatin are crosslinked with a reagent selected from the group consisting of a polyethylene glycol diacrylate (PEGDA), a polyethylene glycol divinyl sulfone, a polyethylene glycol bismaleimide, a polyethylene glycol dimethyacrylate, a polyethylene glycol (methyl)acrylamide, and a polyethylene glycol di(halo)acetate.

Embodiment 102

The method of embodiment 99, wherein said wherein said derivatives of hyaluronan and gelatin are crosslinked with a polyethylene glycol diacrylate (PEGDA).

Embodiment 103

The method according to any one of embodiments 92-102, wherein said hydrogel comprises a heparin or a heparin derivative.

Embodiment 104

The method of embodiment 103, wherein said heparin derivative is a thiol-modified heparin.

Embodiment 105

The method of embodiment 104, wherein said heparin derivative is linked to said hyaluronan derivative and/or to said gelatin derivative.

Embodiment 106

The method of embodiment 105, wherein heparin derivative is linked to said hyaluronan derivative and/or to said gelatin derivative with a divalent or polyvalent electrophile.

Embodiment 107

The method of embodiment 106, wherein heparin derivative is linked to said hyaluronan derivative and/or to said gelatin derivative with a reagent selected from the group consisting of a polyethylene glycol diacrylate (PEGDA), a polyethylene glycol divinyl sulfone, a polyethylene glycol bismaleimide, a polyethylene glycol dimethyacrylate, a polyethylene glycol (methyl)acrylamide, and a polyethylene glycol di(halo)acetate.

Embodiment 108

The method of embodiment 105, wherein heparin derivative is linked to said hyaluronan derivative and/or to said gelatin derivative with a polyethylene glycol diacrylate (PEGDA).

Embodiment 109

The method according to any one of embodiments 92-108, wherein said hydrogel comprises at most about 10% solids w/v.

Embodiment 110

The method according to any one of embodiments 92-108, wherein said hydrogel comprises at most about 5% solids w/v.

Embodiment 111

The method according to any one of embodiments 92-108, wherein said hydrogel comprises at most about 3% solids w/v.

Embodiment 112

The method according to any one of embodiments 84-111, wherein said progenitor cells are derived from fibroblasts.

Embodiment 113

The method of embodiment 112, wherein said progenitor cells are derived from dermal fibroblasts.

Embodiment 114

The method of embodiment 113, wherein said progenitor cells are derived from neonatal dermal fibroblasts.

Embodiment 115

The method according to any one of embodiments 84-111, wherein said progenitor cells are derived from epithelia cells.

Embodiment 116

The method of embodiment 115, wherein said progenitor cells are derived from renal epithelia cells.

Embodiment 117

A pharmaceutical composition for the treatment of subcortical white matter stroke, including induced pluripotent glial-enriched progenitor cells.

Embodiment 118

The pharmaceutical composition of embodiment 117, wherein said progenitor cells are suspended in an injectable buffer.

Embodiment 119

The pharmaceutical composition of embodiment 117, wherein said composition comprises a depot delivery system.

Embodiment 120

The pharmaceutical composition of embodiment 119, wherein the depot delivery system comprises a hydrogel (e.g., an injectable hydrogel).

Embodiment 121

The pharmaceutical composition of embodiment 120, wherein said hydrogel comprises a biopolymer.

Embodiment 122

The pharmaceutical composition of embodiment 121, wherein said hydrogel comprises one or more materials selected from the group consisting of hyaluronan, gelatin, thiol-modified hyaluronan, heparin, thiol-modified heparin, thiol-modified chondroitin sulfate, thiol-modified gelatin, a hyaluronan sodium salt, and an acrylated hyaluronic acid.

Embodiment 123

The pharmaceutical composition according to any one of embodiments 120-122, wherein said hydrogel comprises a hyaluronan derivative and a gelatin derivative.

Embodiment 124

The pharmaceutical composition of embodiment 123, wherein hyaluronan derivative comprises a thiolated hyaluronan.

Embodiment 125

The pharmaceutical composition according to any one of embodiments 123-124, wherein said gelatin derivative comprises a thiolated gelatin.

Embodiment 126

The pharmaceutical composition according to any one of embodiments 124-125, wherein said thiolated hyaluronan and thiolated gelatin are have each been thiol-modified using carbodiimide mediated hydrazide chemistry.

Embodiment 127

The pharmaceutical composition according to any one of embodiments 123-126, wherein said thiol-modified derivatives of hyaluronan and gelatin are crosslinked to form a hydrogel.

Embodiment 128

The pharmaceutical composition of embodiment 127, wherein said derivatives of hyaluronan and gelatin are crosslinked with a divalent or polyvalent electrophile.

Embodiment 129

The pharmaceutical composition of embodiment 128, wherein said derivatives of hyaluronan and gelatin are crosslinked with a reagent selected from the group consisting of a polyethylene glycol diacrylate (PEGDA), a polyethylene glycol divinyl sulfone, a polyethylene glycol bis-maleimide, a polyethylene glycol dimethyacrylate, a polyethylene glycol (methyl)acrylamide, and a polyethylene glycol di(halo)acetate.

Embodiment 130

The pharmaceutical composition of embodiment 127, wherein said wherein said derivatives of hyaluronan and gelatin are crosslinked with a polyethylene glycol diacrylate (PEGDA).

Embodiment 131

The pharmaceutical composition according to any one of embodiments 120-130, wherein said hydrogel comprises a heparin or a heparin derivative.

Embodiment 132

The pharmaceutical composition of embodiment 131, wherein said heparin derivative is a thiol-modified heparin.

Embodiment 133

The pharmaceutical composition of embodiment 132, wherein said heparin derivative is linked to said hyaluronan derivative and/or to said gelatin derivative.

Embodiment 134

The pharmaceutical composition of embodiment 133, wherein heparin derivative is linked to said hyaluronan derivative and/or to said gelatin derivative with a divalent or polyvalent electrophile.

Embodiment 135

The pharmaceutical composition of embodiment 134, wherein heparin derivative is linked to said hyaluronan derivative and/or to said gelatin derivative with a reagent selected from the group consisting of a polyethylene glycol diacrylate (PEGDA), a polyethylene glycol divinyl sulfone, a polyethylene glycol bismaleimide, a polyethylene glycol dimethyacrylate, a polyethylene glycol (methyl)acrylamide, and a polyethylene glycol di(halo)acetate.

Embodiment 136

The pharmaceutical composition of embodiment 133, wherein heparin derivative is linked to said hyaluronan derivative and/or to said gelatin derivative with a polyethylene glycol diacrylate (PEGDA).

Embodiment 137

The pharmaceutical composition according to any one of embodiments 120-136, wherein said hydrogel comprises at most about 10% solids w/v.

Embodiment 138

The pharmaceutical composition according to any one of embodiments 120-136, wherein said hydrogel comprises at most about 5% solids w/v.

Embodiment 139

The pharmaceutical composition according to any one of embodiments 120-136, wherein said hydrogel comprises at most about 3% solids w/v.

Embodiment 140

The pharmaceutical composition according to any one of embodiments 117-139, wherein said progenitor cells are derived from fibroblasts.

Embodiment 141

The pharmaceutical composition of embodiment 140, wherein said progenitor cells are derived from dermal fibroblasts.

Embodiment 142

The pharmaceutical composition of embodiment 141, wherein said progenitor cells are derived from neonatal dermal fibroblasts.

Embodiment 143

The pharmaceutical composition according to any one of embodiments 117-139, wherein said progenitor cells are derived from epithelia cells.

Embodiment 144

The pharmaceutical composition of embodiment 143, wherein said progenitor cells are derived from renal epithelia cells.

BRIEF DESCRIPTION OF THE DRAWINGS

FIG. 3, panels A-B, shows representative fluorescent photomicrographs of astrocyte activation and axonal loss in the stroke-injured mouse brain. Image panels show fluorescent immunostaining of astrocytes (GFAP) and axons (NF200) three weeks after stroke injury in the uninjured contralateral hemisphere (A, control) and stroke-injured hemisphere (B, white matter stroke). In (A), the left column depicts the merged fluorescent image for GFAP (green) and NF200 (red), the middle column depicts GFAP alone, and the right column depicts NF200 alone. In (B), the left column depicts NF200 alone; the middle column depicts GFAP alone, and the right column depicts the merged fluorescent image for GFAP (green) and NF200 (red). For (A) and (B), the rows show increasing levels of magnification for the lesioned area (B) and contralateral side (A). Top rows=40×, middle rows=200×, bottom. White boxes in (A) indicate the regions magnified in lower panels. The white dotted lines in (A) indicate the approximate borders of the corpus callosum. The asterisks in (A) and (B) indicate the lateral ventricle. Abbreviations: Cx=cortex; GFAP=glial fibrillary acid protein; NF200=neurofilament 200; Str=striatum; WM=white matter.

FIG. 7, panels A-D, illustrates mouse subcortical white matter stroke and cell transplantation. (A) Mouse MRI taken 1 month after L-NIO injections. Arrows denote hyperintensity caused by stroke. (B) MRI taken 1 month after L-NIO injections and iPSC-NPCs transplantation. (C) MM taken 1 month after L-NIO injections and iPSC-GEPs transplantation. Arrows in B and C denote the apparent repair of damaged white matter due to the iPSC transplantation. Panel D shows the mean gray value per pixel: This is the sum of the gray values of all the pixels in the selection divided by the number of pixels. Reported in calibrated units, measured on the contralateral (uninjured) and the ipsilateral (injured) side of the mouse brain in the different treatment groups. Error bars denote standard error of the mean. Asterisk indicate significance relative to the uninjured side of the brain using two-way ANOVA with Tukey's HSD post-hoc analysis ($p<0.05$).

DETAILED DESCRIPTION

Figure 1:
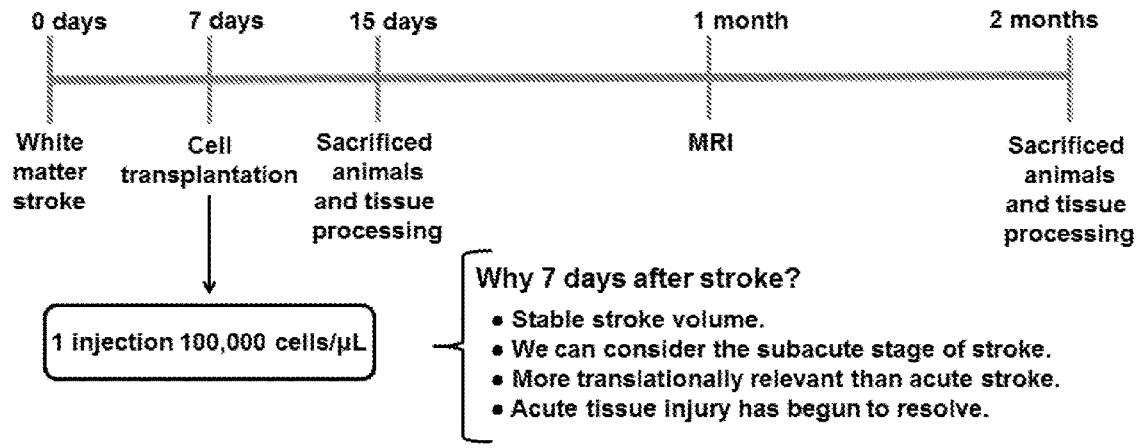
FIG. 1 shows an experimental timeline of Study 1 testing iPSC-NPCs or iPSC-GEPs transplantation in a mouse model of white matter stroke. Key time points in the experimental design are shown, including iPSC-NPCs or iPSC-GEPs transplantation seven days post-stroke and tissue processing, fifteen days post-cell transplant. iPSC-NPCs or iPSC-GEPs=100,000 cells/mouse as a single 1 µL injection. Abbreviations: L-NIO=N5-(1-iminoethyl)-L-ornithine, dihydrochloride; iPSC-NPCs=induced pluripotent stem cells neuronal progenitor cells; iPSC-GEPs=induced pluripotent stem cells glial-enriched progenitor cells.

In various embodiments, the methods and compositions described herein pertain to the discovery that iPS-GEP transplantation after cerebral ischemic injury enhances recovery in a murine model of WMS. Transplantation of iPS-GEP at subacute time points (e.g., 7 days after stroke) into the regions of the white matter stroke produced widespread migration of iPS-GEPs throughout subcortical white matter and resulted in increased myelination within the damaged white matter and reduced measures of reactive astrocytosis and inflammation. MM imaging of white matter after transplantation of iPS-GEPs showed reduction in the hyperintensities that are characteristic of white matter damage in both the mouse model and human WMS. Behavioral evaluation demonstrated improvements in two tests of motor function. These results indicate that iPS-GEP transplantation promotes white matter repair and recovery in white matter stroke.

Accordingly, in various embodiments methods for the use of iPS-GEPs in the treatment of cerebral ischemic injury, such as white matter stroke are provided. Also provided herein are pharmaceutical compositions and formulations suitable for use in cell-based clinical therapy of white matter stroke.

Uses of Induced Pluripotent Glial-Enriched Progenitor Cells (iPSC-GEPs)

Derivation of glial-enriched progenitors (GEPs) from induced pluripotent stem cells, e.g., as described herein, provides a renewable and scalable source of GEPs for a number of important therapeutic, research, development, and commercial purposes, including, but not limited to treatment of cerebral ischemic injuries.

The term induced pluripotent glial-enriched progenitor cell (iPSC-GEP) refers to cells of a specific, characterized, in vitro differentiated cell population containing a mixture of astrocytes and other characterized cell types obtained from undifferentiated induced pluripotent stem cells according to the specific differentiation protocols described herein.

Compositional analysis of iPS-GEPs by immunocytochemistry (ICC), microarray analysis, and quantitative polymerase chain reaction (qPCR) demonstrates that the cell population is comprised primarily of neural lineage cells of the astrocyte and neuronal phenotype. Because of the method for generation of iPS-GEPs, substantially all cells in the culture are neural. This has been established because as part of the method, neural rosette structures are isolated manually and used to expand just neural derivatives. In addition, the method has been validated by immunostaining for various neural markers to determine identity. Finally, single-cell RT-PCR demonstrated that all cell express at least a subset of neural markers. There is no evidence that non-neural cells are present in these cultures.

As explained above, it was discovered that IPSGEPs can be used in the treatment, inter alia, of white matter stroke. The terms "treatment," "treat" "treated," or "treating," as used herein, can refer to both therapeutic treatment or prophylactic or preventative measures, where the goal is to prevent or slow down (lessen) an undesired physiological condition, symptom, disorder or disease, or to obtain beneficial or desired clinical results. In some embodiments, the term may refer to both treating and preventing. For the purposes of this disclosure, beneficial or desired clinical results may include, but are not limited to one or more of the following: alleviation of adverse symptoms; diminishment of the extent of the condition, disorder or disease; stabilization (i.e., not worsening) of the state of the condition, disorder or disease; delay in onset or slowing of the progression of the condition, disorder or disease; amelioration of the condition, disorder or disease state; and remission (whether partial or total), whether detectable or undetectable, or enhancement or improvement of the condition, disorder or disease. Treatment includes eliciting a clinically significant response. Treatment also includes prolonging survival as compared to expected survival if not receiving treatment. In certain embodiments, particularly in the case of cerebral ischemia, treatment may include improving or restoring motor control, improving or restoring speech, improving or restoring balance, improving cognition (e.g., as measured by any of a variety of cognitive function assays), and the like.

The term "subject" and "patient" are used interchangeably herein and include, but are not limited to mammals such as humans, non-human primates, other mammals, e.g., a non-human primate, canine, equine, feline, porcine, bovine, lagomorph, and the like. In certain embodiments the subject is a subject identified as having a pathology characterized by demyelination, e.g., as described herein. In certain embodiments the subject is a subject determined to be at risk for a pathology characterized by demyelination of neural tissue in the central nervous system. Such characterization can be based on family history, previous instance of pathology in the subject, test results including, but not limited to, genetic tests identifying the subject as at risk for a demyelinating pathology, and the like. In some embodiments, the term "subject," refers to a male. In some embodiments, the term "subject," refers to a female.

In various embodiments the iPS-GEPs described herein promotes myelin repair and/or remyelination and/or slow demyelination in human patients or other subjects in need of therapy. The following are non-limiting examples of conditions, diseases and pathologies requiring myelin repair or remyelination: brain ischemic injuries including white matter stroke, multiple sclerosis, the leukodystrophies, the Guillain-Barre Syndrome, the Charcot-Marie-Tooth neuropathy, Tay-Sachs disease, Niemann-Pick disease, Gaucher disease, Hurler syndrome and traumatic injuries resulting in loss of myelination, such as acute spinal cord injury.

In certain embodiments, in addition to myelin repair or remyelination, iPS-GEPs can produce neurotrophic factors, e.g. BDNF, that may directly provide reparative action on the damaged tissue (e.g., ischemic tissue), such as GDF15, GDNF, VEGFa, TGFβ, and the like.

In various embodiments the iPS-GEPs are administered in a manner that permits them to reside at, and/or graft to, and/or migrate to the intended tissue site and reconstitute or regenerate the functionally deficient area, and/or to stabilize and/or prevent further degradation of neural tissue. Administration of the cells to a subject may be achieved by any method known in the art. For example the cells may be administered surgically directly to the organ or tissue in need of a cellular transplant. Alternatively non-invasive procedures may be used to administer the cells to the subject. Examples of non-invasive delivery methods include the use of syringes and/or catheters and/or cannula to deliver the cells into the organ or tissue in need of cellular therapy.

In certain embodiments, the iPS-GEPs are administered into the infarct core. In certain embodiments, the OPCs are additionally or alternatively administered adjacent to the infarct core. "Adjacent", as used herein, refers to the area outside the infarct core that in some instances represents an area of partial ischemic (e.g., stroke) damage. In certain embodiments "adjacent" refers to healthy tissue outside the infarct region. In some embodiments, the iPS-GEPs are administered from about 0.05 mm to about 3 mm from the infarct core. In some embodiments, the iPS-GEPs are administered from about 0.1 mm to about 2 mm from the infarct core. In some embodiments, the iPS-GEPs are administered from about 0.5 mm to about 1 mm from the infarct core. In some embodiments, the iPS-GEPs are administered from about 0.3 mm to about 0.6 mm from the infarct core.

In certain embodiments, the iPS-GEPs are administered to the subject during the subacute time period. "Subacute" as used herein refers to the time period between acute and chronic phases during which the initial damage and cell death from the ischemic (e.g., stroke) injury has ended. As used herein, "early subacute" in a human subject refers to up to one month after the stroke and "late subacute" refers to the time period 1-3 months after the stroke.

In certain embodiments, the subject receiving iPS-GEPs as described herein can be treated to reduce immune rejection of the transplanted cells. Methods of reducing immune rejection of cells and/or tissue are well known to those of skill in the art. Such methods include, but are not limited to, the administration of traditional immunosuppressive drugs such as tacrolimus, cyclosporin A, and the like (see, e.g., Dunn et al. (2001) *Drugs* 61: 1957), or inducing immunotolerance using a matched population of pluripotent stem derived cells (see, e.g., WO 02/44343; U.S. Pat. No. 6,280,718; WO 03/050251). In certain embodiments, a combination of anti-inflammatory (such as prednisone or other steroidal anti-inflammatories) and immunosuppressive drugs may be used. In certain embodiments, the iPS-GEPs can be supplied in the form of a pharmaceutical composition, comprising an isotonic excipient prepared under sufficiently sterile conditions for human administration.

For general principles in medicinal formulation, the reader is referred to Allogeneic Stem Cell Transplantation, Lazarus and Laughlin Eds. Springer Science+ Business Media LLC 2010; and Hematopoietic Stem Cell Therapy, E. D. Ball, J. Lister & P. Law, Churchill Livingstone, 2000. Choice of the cellular excipient and any accompanying elements of the composition will be adapted in accordance with the route and device used for administration. The composition may also comprise or be accompanied with one or more other ingredients that facilitate the engraftment or functional mobilization of the enriched target cells. Suitable ingredients may include matrix proteins that support or promote adhesion of the target cell type or that promote vascularization of the implanted tissue.

Production of Induced Pluripotent Glial-Enriched Progenitor Cells (iPSC-GEPs).

Methods of generating induced pluripotent stem cells (IPSCs) are known to those of skill in the art. The original method of reprogramming murine fibroblasts by Takahashi and Yamanaka (2006) *Cell* 126: 663-676 utilized retroviral transduction of Oct4, Sox2, Klf4, and c-myc into mouse embryonic fibroblasts (MEFs) or tail-tip fibroblasts (TTF) derived from mice expressing β-galactosidase-neomycin fusion protein at the Fbx15 locus, which is specifically expressed in pluripotent stem cells and serves as an excellent marker for pluripotency. Drug selection with G418 after transduction of the four factors resulted in reprogramming of 0.02% of the MEFs or TTFs 14-21 days post-transduction. Reprogramming of adult human dermal fibroblasts (HDFs) was first reported to occur at an efficiency of ~0.02% at ~30 days after transducing the four reprogramming factors (Takahashi et al. (2007) *Cell.* 131: 861-872)

In various embodiments a lentiviral expression system can be employed to deliver Oct4, Sox2, Nanog, and Lin28 to fibroblasts (Yu et al. (2007) *Science,* 318: 1917-1920) and single cassette reprogramming vectors have been developed using, e.g., Cre-Lox mediated transgene excision (see, e.g., Papapetrou et al. (2009) *Proc. Natl. Acad. Sci. USA,* 106: 12759-12764; Carey et al. (2009) *Proc. Natl. Acad. Sci. USA,* 106: 157-162; Chang et al. (2009) *Stem Cells* 27: 1042-1049; Sommer et al. (2009) *Stem Cells,* 27:543-549; Soldner et al. (2009) *Cell* 136: 964-977). Other viral sytsems can also be used for reprogramming. Such systems include, but are not limited to adenovirus systems (see, e.g., Stadtfeld et al. (2008) *Science,* 322: 945-949; Zhou and Freed (2009) *Stem Cells* 27: 2667-2674, etc.), and sendai virus systems (see, e.g., Fusaki et al. (2009) *Proc. Jpn. Acad. Ser. B Phys. Biol. Sci.* 85: 348-362; Seki et al. (2010) *Cell Stem Cell.* 7: 11-14; Ban et al. (2011) *Proc. Natl. Acad. Sci. USA,* 108: 14234-14239). Reprogramming has also been accomplished using mRNA transfection (see, e.g., 19), miRNA infection/transfection (see, e.g., Subramanyam et al. (2011) *Nat. Biotechnol.* 29: 443-448; Anokye-Danso et al. (2011) *Cell Stem Cell* 8: 376-388), PiggyBac, mobile genetic element (transposon) that in the presence of a transposase can be integrated into chromosomal TTAA sites and subsequently excised from the genome footprint-free upon re-expression of the transposase (see, e.g., Kaji et al. 92009) *Nature* 458: 771-775; Woltjen et al. (2009) *Nature* 458: 766-770), mini-circle vectors (see, e.g., Narsinh et al. (2011) *Nature Protoc.* 6: 78-88), episomal plasmids (Okita et al. (2008) *Science* 322: 949-953; Yu et al. (2007) *Science* 318: 1917-1920; Hu et al. (2011) *Blood* 117: e109-e119), oriP/EBNA vectors (31, 32), and the like.

One suitable method for fast and efficient induction of glial-enriched progenitor cells from human iPS cells has recently been described by Xie et al. (2014) *Stem Cell Reports* 3: 743-757). This technique utilizes changes in oxygen tension in the cell culture medium, or its downstream oxygen signaling molecules—the hypoxia-inducing factor (Hif) system. Treatment with deferoxamine, an inducer of Hif, produces a lasting restriction of the differentiation potential of iPS-NPCs to more of an astrocyte fate (Id.). This approach establishes a protocol that can serve to produce efficient induction of a glial-enriched precursor cell for transplantation as a therapy for WMS.

The production of suitable IPS-GEPs is illustrated below in the materials and methods. These methods are intended to be illustrative and non-limiting. Using the teachings provided herein other methods of generating suitable ISP-GEPs will be available to one of skill in the art.

Pharmaceutical Compositions

In certain embodiments the induced pluripotent glial-enriched progenitor cells (iPSC-GEPs) may be administered to a subject in need of therapy per se. Alternatively, the cells may be administered to the subject in need of therapy in a pharmaceutical composition mixed with a suitable carrier and/or using a depot delivery system.

As used herein, the term "pharmaceutical composition" refers to a preparation comprising a therapeutic agent or therapeutic agents in combination with other components, such as physiologically suitable carriers and excipients.

As used herein, the term "therapeutic agent" refers to the cells described herein (e.g., induced pluripotent glial-enriched progenitor cells (iPSC-GEPs) or IPC-NPCs) accountable for a biological effect in the subject. Depending on the embodiment "therapeutic agent" may refer to the IPSC-GEPs and/or IPC-NPCs described herein. Additionally or alternatively, "therapeutic agent" may refer to one or more factors secreted by the IPSC-GEPs in aiding neural repair.

As used herein, the term "therapeutically effective amount" means a dosage, dosage regimen, or amount sufficient to produce a desired result.

As used herein, the terms "carrier" "physiologically acceptable carrier" and "biologically acceptable carrier" may be used interchangeably and refer to a diluent or a carrier substance that does not cause significant adverse effects or irritation in the subject and does not substantially abrogate the biological activity or effect of the therapeutic agent. The term "excipient" refers to a substance added to a pharmaceutical composition to further facilitate administration of the therapeutic agent.

In certain embodiments the compositions contemplated herein (e.g. formulations containing IPSC-GEPs) can be formulated for parenteral administration by injection, e.g., by bolus injection or continuous infusion. In certain embodiments the compositions can be administered by continuous infusion subcutaneously over a period of about 15 minutes to about 24 hours. In certain embodiments formulations for injection can be presented in unit dosage form, e.g., in ampoules or in multi-dose containers, optionally with an added preservative. The compositions can take such forms as suspensions, solutions or emulsions in oily or aqueous vehicles, and can contain formulatory agents such as suspending, stabilizing and/or dispersing agents.

In certain embodiments the progenitor cells (e.g., IPSC-GEPs) described herein can be administered (e.g., injected, perfused, etc.) suspended in a buffer. Suitable buffers are known to those of skill in the art. One illustrative, but non-limiting buffer is ISOLYTE® S plus 25% human serum albumin (HAS). ISOLYTE® S (multi-electryolyte injection solution) contains in 100 mL sodium chloride USP 0.53 g; sodium gluconate USP 0.5 g, sodium acetate trihydrate USP 0.37 g; potassium chloride USP 0.037 g, magnesium chloride hexahydrate USP 0.03 g, water for injection USP qs, and is ph adjusted with glacial acetic acid USP ph: 6.7 (6.3-7.3) with a calculated osmolarity of about 295 mOsmol/liter. This buffer is illustrative and non-limiting. Numerous other suitable injection buffers will be known to those of skill in the art.

In certain embodiments the progenitor cells (e.g., IPSC-GEPs) described herein can be provided in implantable sustained delivery systems. Implantable sustained delivery systems are known to those of skill in the art. Such systems include, but are not limited to, mechanical and/or electronic devices such as implantable drug pumps or microchip systems as well as implantable controlled delivery polymeric matrices.

Implantable microchip systems, include systems such as the MICROCHIPS® device (MicroChips, Inc. Bedford MA). The MicroCHIPS implantable drug delivery system (IDDS) is based on a microfabricated silicon chip that contains multiple drug-filled reservoirs. The chip is attached to a titanium case containing a battery, control circuitry, and telemetry. The drug chip and titanium case are hermetically sealed and electrically linked by a ceramic substrate with metal interconnects. The IDDS communicates with an external handheld controller through wireless transmission. A drug regimen can be transmitted to the implanted device through this link, allowing reservoirs to be opened at prescribed times without any need for further communication. Alternatively, reservoirs can be opened as desired on command from the controller.

Controlled release polymeric devices can be made for long term release following implantation. Illustrative controlled polymeric release devices comprise an implantable rod, cylinder, film, disk, and the like, or an injectable polymeric formulation (e.g. a microparticle formulation). In various embodiments the implantable matrix can be in the form of microparticles such as microspheres, where the IPSC-GEPs are dispersed within a solid polymeric matrix or microcapsules. Typically in such systems the core is of a different material than the polymeric shell, and the active agent (e.g., IPSC-GEPs) will be dispersed or suspended in the core, which may be liquid or solid in nature. Alternatively, the polymer may be cast as a thin slab or film, or even a gel such as a hydrogel.

In certain embodiments either non-biodegradable or biodegradable matrices can be used for delivery of progenitor cells as described herein, however, in certain embodiments biodegradable matrices are typically preferred. These can include natural or synthetic polymers. Often synthetic polymers provide better characterization of degradation and release profiles. The polymer is typically selected based on the period over which release is desired. In some cases linear release may be most useful, although in others a pulse release or "bulk release" may provide more effective results. As discussed below, in certain embodiments, the polymer is in the form of a hydrogel, and can optionally be crosslinked with multivalent ions or polymers.

In various embodiments the matrices can be formed by solvent evaporation, spray drying, solvent extraction and other methods known to those skilled in the art. Bioerodible microspheres can be prepared using any of the methods developed for making microspheres for drug delivery, for example, as described by Mathiowitz and Langer (1987) *J. Controlled Release* 5:13-22; Mathiowitz, et al. (1987) *Reactive Polymers* 6: 275-283, Mathiowitz, et al. (1988) *J. Appl. Polymer Sci.* 35:755-774, and the like.

In various embodiments the devices can be formulated for local release to treat the area of implantation, e.g., the infarct cavity. In various embodiments these can be implanted or injected into the desired region.

In certain embodiments the implantable the depot delivery systems comprise microparticles patterned within a hydrogel. In one illustrative embodiment, the progenitor cells are provided within or mixed with microparticles (e.g., PLGA microparticles) entrapped within a hydrogel (e.g., PEG hydrogel) base. Such systems have been constructed to deliver agents with two different delivery profiles (see, e.g., Wang et al. (2011) *Pharmaceutical Res.,* 28(6): 1406-1414).

In certain embodiments the progenitor cells described herein can be administered as a component of a hydrogel, such as those described in U.S. patent application Ser. No. 14/275,795, filed May 12, 2014, and U.S. Pat. Nos. 8,324,184 and 7,928,069. Hydrogels comprising synthetic polymers such as poly (hydroxyethyl methacrylate) (PHEMA), poly-(ethylene glycol) (PEG) and poly (vinyl alcohol) (PVA) and/or comprising naturally sourced material such as collagen, hyaluronic acid (HA), fibrin, alginate, agarose and chitosan are known in the art (see, e.g., Peppas et al. (2006) *Advanced Materials* 18:1345; Lee et al. (2001) *Chem. Rev.* 101:1869). Covalently cross-linked hydrogels formed by various chemical modifications have also been previously described (see, e.g., Vercruysse et al. (1997) *Bioconjugate Chem.* 8:686; Prestwich et al. (1998) *J. Controlled Release* 53:93; Burdick et al. (2005) *Biomacromolecules* 6:386; Gamini et al. (2002) *Biomaterials* 23:1161; U.S. Pat. Nos. 7,928,069; 7,981,871).

Hydrogels based on thiol-modified derivatives of hyaluronic acid (HA) and gelatin cross-linked with polyethylene glycol diacrylate (PEGDA) (trade name HYSTEM®) have unique chemical, biological and physical attributes making them suitable for many applications including cell culture, drug delivery and the like (see, e.g., Shu et al. (2004) *J of Biomed Mat Res Part A* 68:365; Shu et al. (2002) *Biomacromolecules* 3:1304; Vanderhooft et al. (2009) *Macromolecular Biosci* 9:20). Cross-linked HA hydrogels, including HYSTEM®, have been successfully used in animal models of corneal epithelial wound healing (see, e.g., Yang et al. (2010) *Veterinary Opthal* 13:144, corneal tissue engineering (Espandar et al. (2012) *Archives of Opthamol* 130:202, and retinal repair Liu et al. (2013) *Tissue Engineering Part A* 19:135).

The preclinical use of hydrogels to maintain bioactivity and slow release of biologics has been described (Cai et al. (2005) *Biomaterials* 26:6054; Zhang (2011) *Biomaterials* 32:9415; Overman et al. (2012) *Proceedings of the National Academy of Sciences of the United States of America* 109: E2230; Garbern et al. (2011) *Biomaterials* 32:2407; Koutsopoulos et al. (2009) *Proceedings of the National Academy of Sciences of the United States of America* 106:4623. Furthermore, their use in cell delivery has been shown to improve cell viability and localization post-implantation (Laflamme et al. (2007) *Nature Biotechnology* 25:1015; Zhong et al. (2010) *Neurorehabilitation and Neural Repair* 24:636; Compte et al. (2009) *Stem Cells* 27:753. Several different hydrogels have been used as excipients in FDA-approved ocular small molecule therapeutics to increase their residence time on the eye surface (see, e.g., Kompella et al. (2010) *Therapeutic Delivery* 1:435).

In addition, two new hydrogel formulations have been reported that show promise in delivering therapeutic cells (see Ballios et al. (2010) *Biomaterials* 31:2555; Caicco et al. (2012) *Journal of Biomedical Materials Research Part A* 101:1472; Yang et al. (2010) *Veterinary ophthalmology* 13:144; Mazumder et al. (2012) *Journal of Biomedical Materials Research Part A* 100:1877.

These formulations and protocols are intended to be illustrative an non-limiting. Using the teachings provided herein, other suitable hydrogel formulations will be available to one of skill in the art.

Illustrative Methods and Materials.

Animal Subjects.

All procedures used were approved by the UCLA Chancellor's Animal Research Committee and were conducted in accordance with the National Institute of Health Guide for the Care and Use of Laboratory Animals. NSG mice (Shultz et al. (2007) *Nat. Rev. Immunol.* 7(20): 118; jaxmice.jax.org/nod-scid-gamma) were obtained from Jackson Laboratories (Bar Harbor, ME). All animal subjects were housed in standard conditions with a 12 hr light/dark cycle and were provided food and water ad libitum.

Induction of Focal Ischemic Lesions Using L-Nio.

Figure 2:
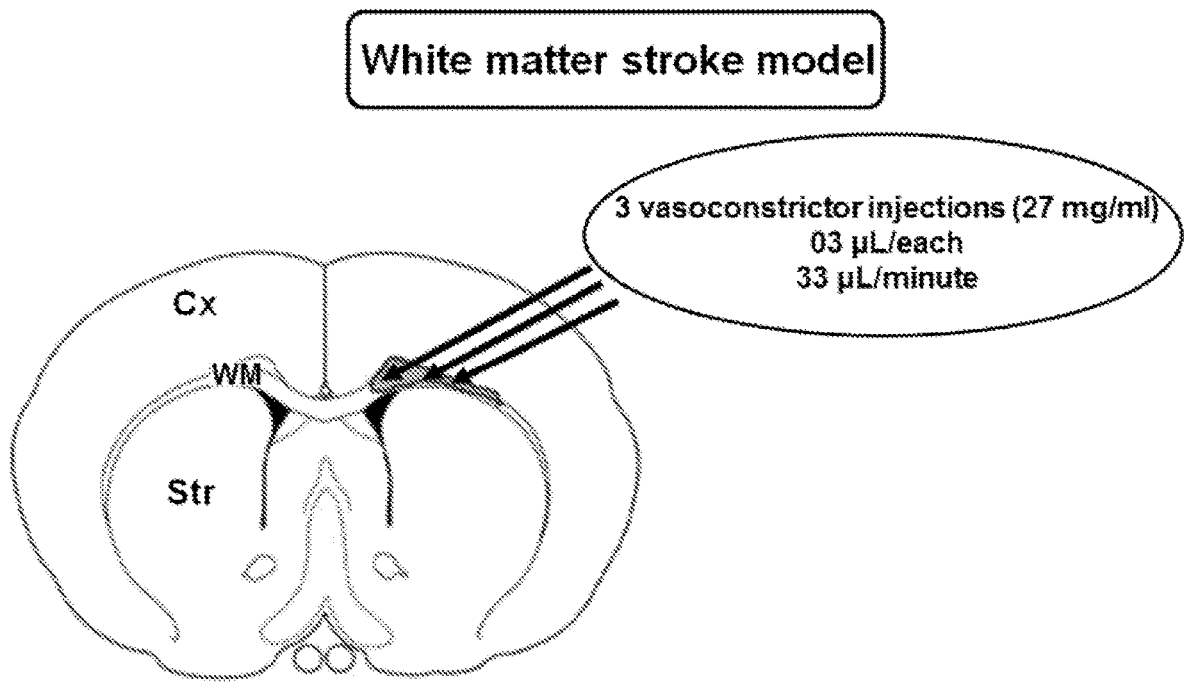
FIG. 2 is a diagram of coronal mouse brain section indicating injection sites of L-NIO. Blue arrows indicated the three injection sites of L-NIO, delivered at an angle of 36° directly into the corpus callosum of each mouse brain to induce a focal ischemic lesion. Abbreviations: Cx=cortex; Str=striatum; WM=white matter.
Figure 4:
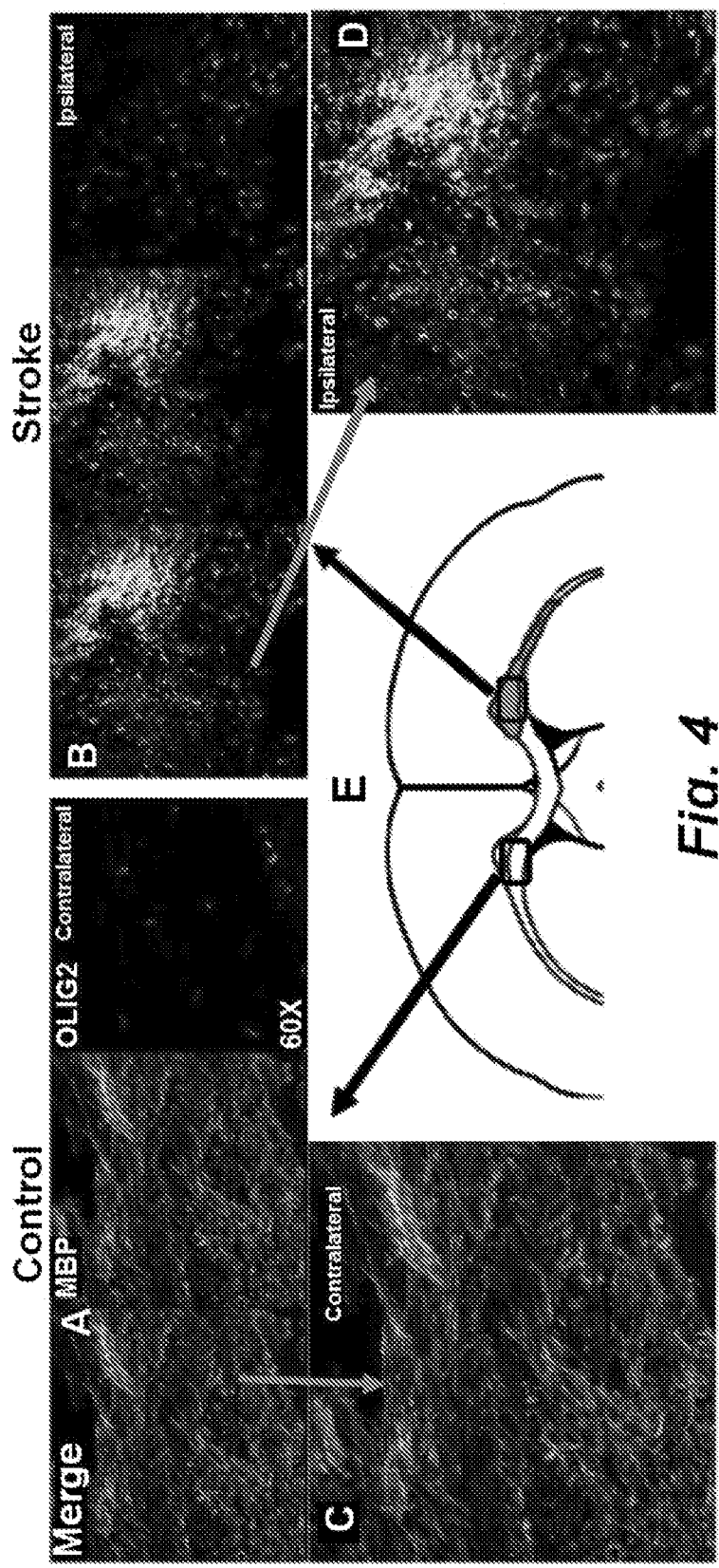
FIG. 4, panels A-F, shows representative fluorescent photomicrographs of myelin loss and oligodendrocyte response in the stroke-injured mouse brain. Relative myelin loss (MBP, green) and oligodendrocyte presence (OLIG2, red) three weeks after stroke injury in the uninjured contralateral corpus callosum (A)-(B), and the injured ipsilateral corpus callosum (C)-(D). For (A) and (B), left panel shows merged image for MBP and OLIG2, middle panel shows MBP alone, and right panel shows OLIG2 alone. Panels (C) and (D) show higher magnification images of the merged images in (A) and (C). (E) Diagram of coronal mouse brain section showing regions depicted in (A)-(D). Magnifications: (A) and (B)=600×; (C) and (D)=1000×. Abbreviations: MBP=myelin basic protein. Panel F shows quantification of myelin basic protein immunoreactivity and oligodendrocyte response within the corpus callosum lesion following stroke injury and iPSC-NPCs or iPSC-GEPs transplantation. Panel E (top)) Mean myelin basic protein (MBP) immunoreactivity is shown for each treatment group at 3 weeks post-stroke (or sham surgery). Panel E (bottom)) The average number of OLIG2 positive cells is shown for each treatment group at 3 weeks post-stroke (or sham surgery). Error bars denote standard error of the mean.
Figure 5:
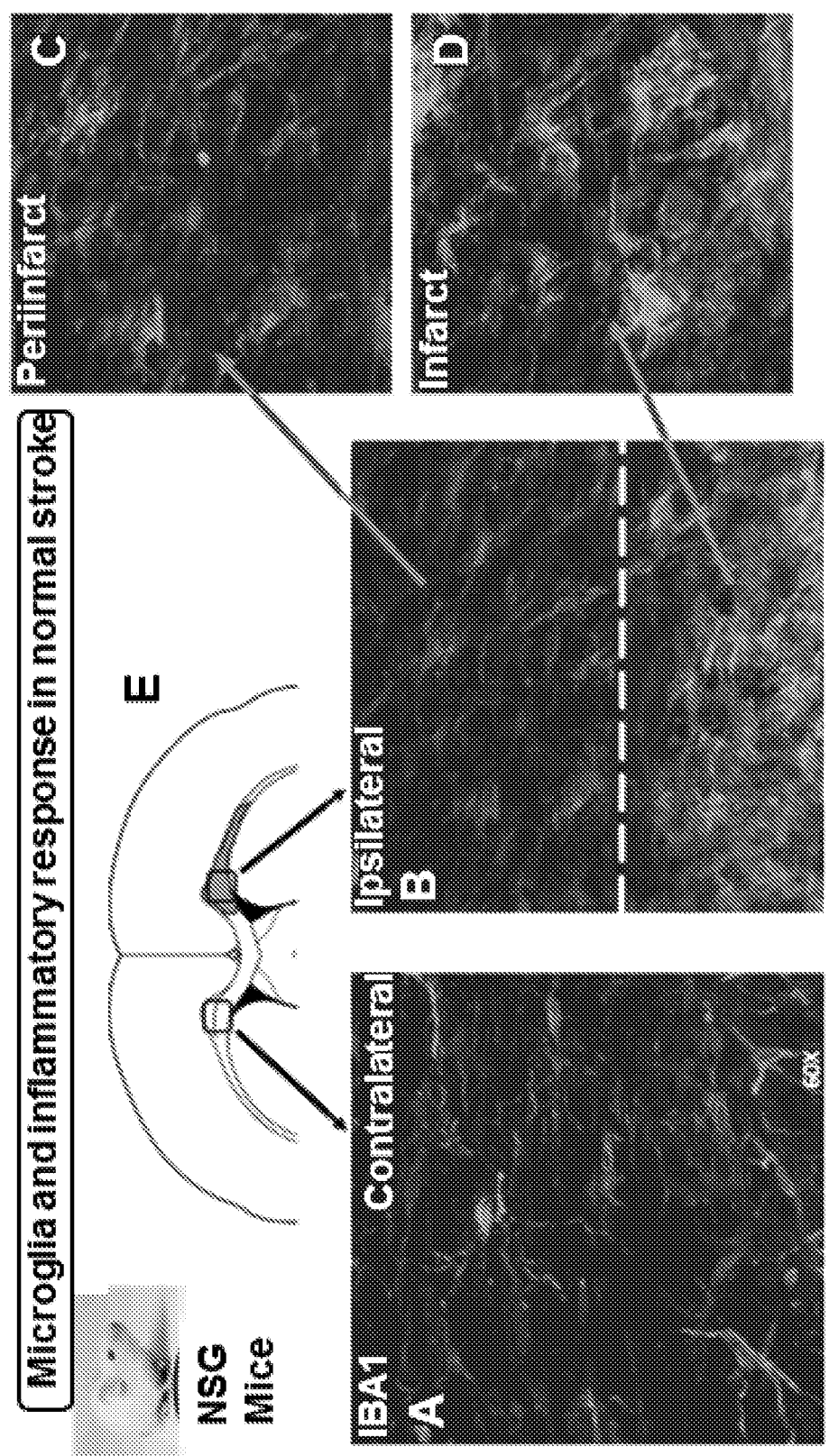
FIG. 5, panels A-E, shows representative fluorescent photomicrographs of activated microglia/immune cells in the stroke-injured mouse brain. (A) Diagram of coronal mouse brain section indicating the regions shown in (B)-(D). (B)-(D) Relative microglial/immune cell activation three weeks after stroke injury as determined by Iba1 labeling (purple) in the uninjured contralateral corpus callosum (B), and the injured ipsilateral corpus callosum (C)-(E). Panels (D) and (E) shown higher magnification images of the regions indicated in (C). Dotted white line in (C) indicates the approximate border between infarct core and peri-infarct tissue. Magnification: (B) and (C)=600×; (D) and (E)=1000×. Abbreviations: Iba1=ionized calcium-binding adapter molecule 1.
Figure 6:
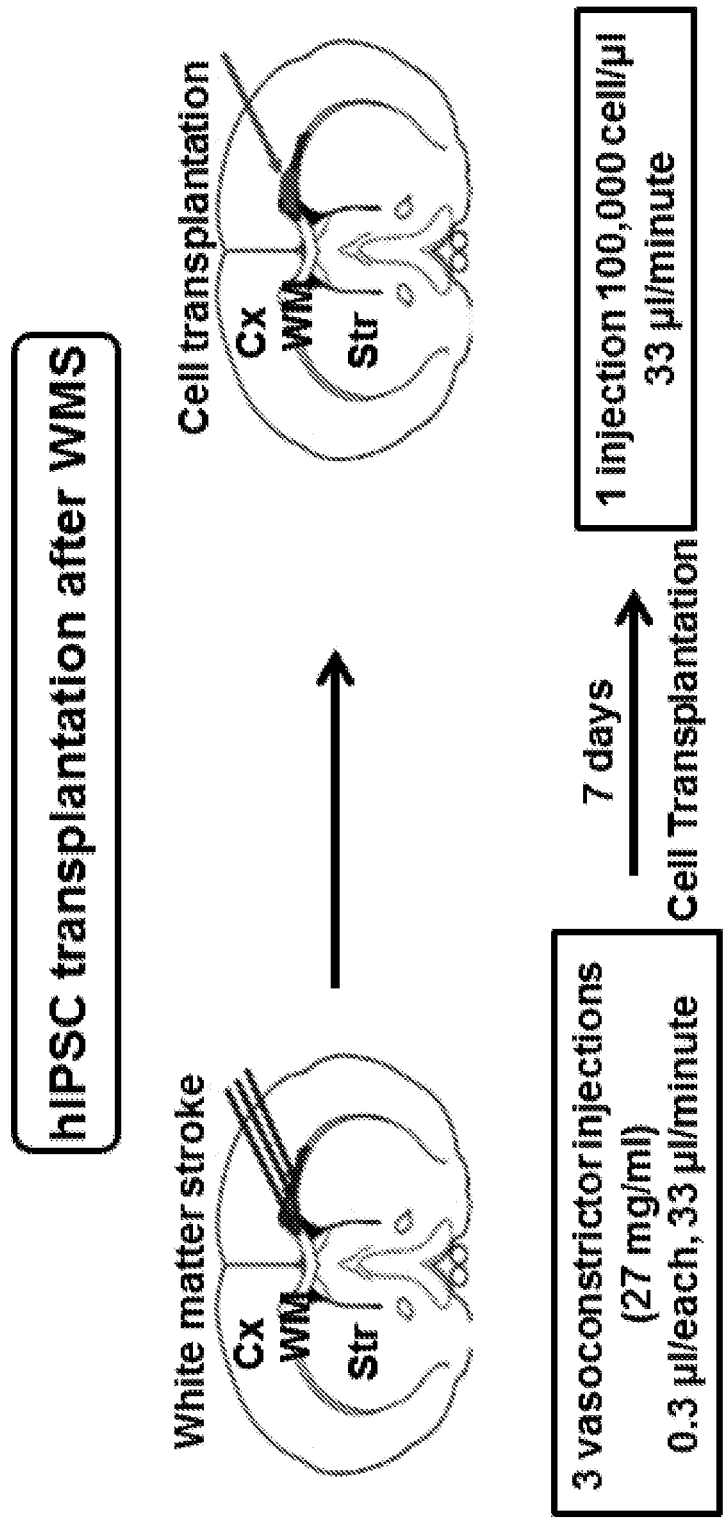
FIG. 6 is a diagram of coronal mouse brain section indicating cell injection site into the uninjured corpus callosum. Arrow indicates approximate cell injection site within the uninjured corpus callosum. Abbreviations; Cx=cortex; Str=striatum; WM=white matter.
Figure 8:
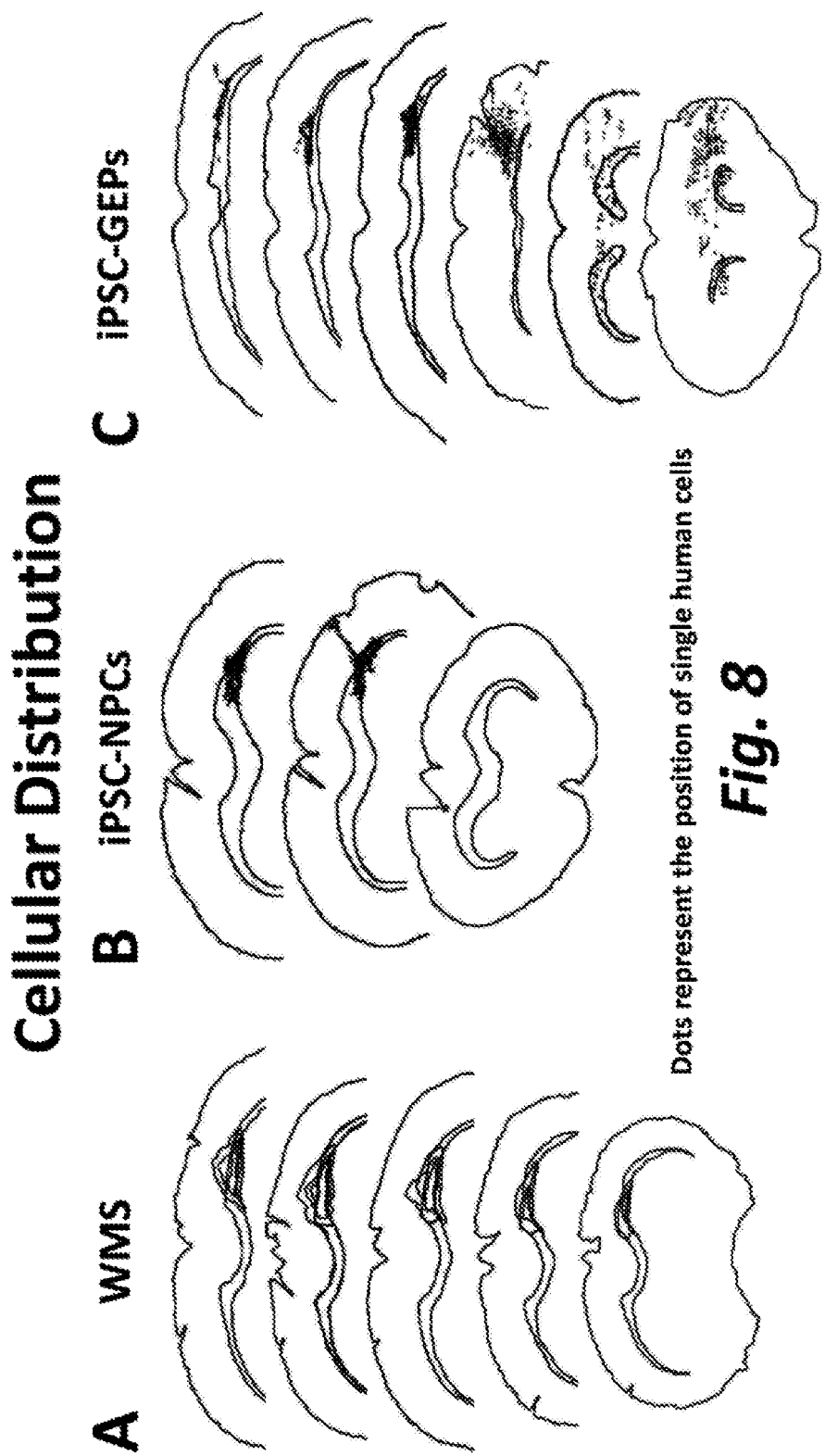
FIG. 8, panels A-C, represents mouse coronal sections indicating the infarct area region, the position IPS-NPCs and the position of iPS-GEPs. Dots represent the position of single human cells. (A) Represent mouse coronal sections indicating the infarct area region. (B) Represent mouse coronal sections indicating the position of iPS-NPCs after 2 months of transplantation. (C) Represent mouse coronal sections indicating the position of iPS-GEPs after 2 months of transplantation. Abbreviations: WMS=white matter stroke; iPSC-NPCs=induced pluripotent stem cells neuronal progenitor cells; iPSC-GEPs=induced pluripotent stem cells glial enriched progenitor cells.
Figure 9:
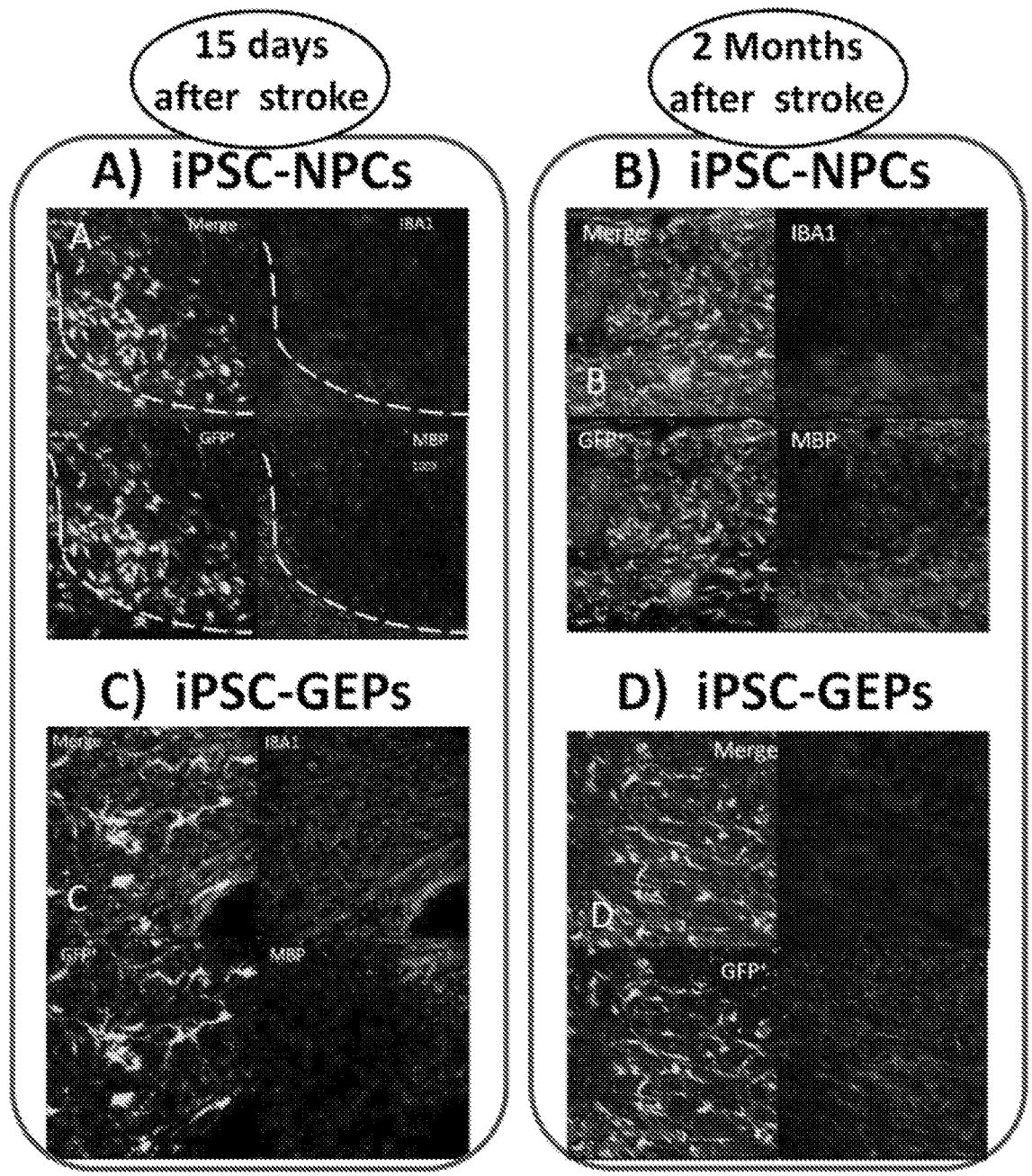
FIG. 9, panels A-D, shows representative fluorescent photomicrographs of iPSC-NPCs or iPSC-GEPs location, activated microglia/immune cells and MBP response in the mouse brain following stroke injury. Image panels show fluorescent immunostaining of GFP+ cells (green), activated microglia/immune cells (IBA-1, blue) and MBP (red) 2 and 8 weeks after stroke injury following iPSC-NPCs or iPSC-GEPs transplantation. In A, panel 1 (left top) depicts the merged fluorescent image for GFP+, MBP and IBA1, panel 2 (right top) depicts IBA-1 alone, panel 3 (left bottom) depicts GFP+ alone, and panel 4 (right bottom) depicts MBP alone after 2 weeks of IPS-NPCs transplantation. In B, panel 1 (left top) depicts the merged fluorescent image for GFP+, MBP and IBA1, panel 2 (right top) depicts IBA-1 alone, panel 3 (left bottom) depicts GFP+ alone, and panel 4 (right bottom) depicts MBP alone after 8 weeks of IPS-NPCs transplantation. In C, panel 1 (left top) depicts the merged fluorescent image for GFP+, MBP and IBA1, panel 2 (right top) depicts IBA-1 alone, panel 3 (left bottom) depicts GFP+ alone, and panel 4 (right bottom) depicts MBP alone after 2 weeks of IPS-GEPs transplantation. In D, panel 1 (left top) depicts the merged fluorescent image for GFP+, MBP and IBA1, panel 2 (right top) depicts IBA-1 alone, panel 3 (left bottom) depicts GFP+ alone, and panel 4 (right bottom) depicts MBP alone after 8 weeks of IPS-GEPs transplantation. Magnification=600×. Abbreviations: MBP=myelin basic protein; IBA-1=ionized calcium-binding adapter molecule; iPSC-GEPs=induced pluripotent stem cells glial enriched progenitor cells.
Figure 10:
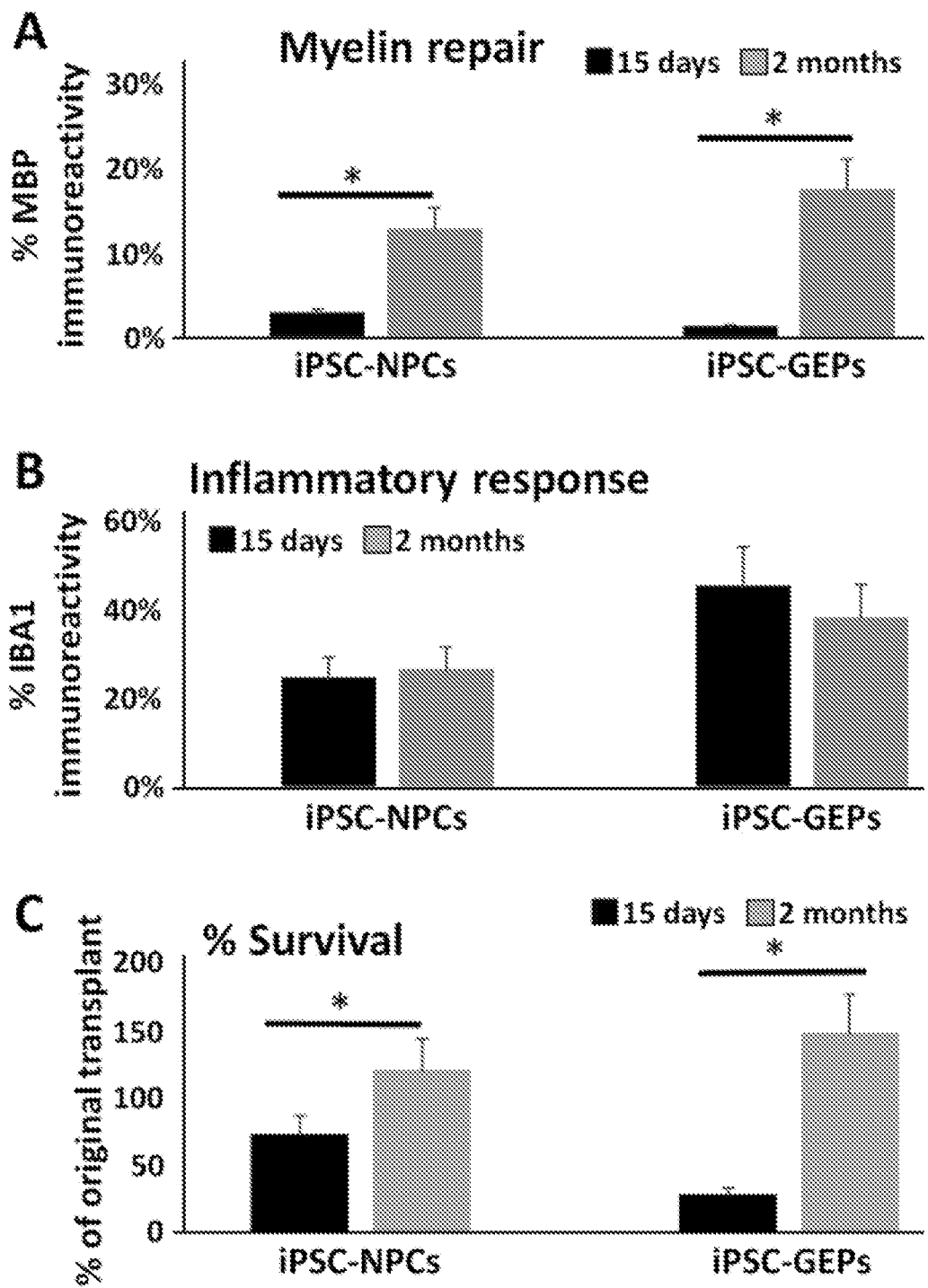
FIG. 10, panels A, B and C, shows quantification of myelin repair, inflammatory response and cell survival in the mouse bran following stroke injury and iPSC-NPCs or iPSC-GEPs transplantation. (A) Myelin repair is shown for each treatment groups at 2 and 8 weeks after cell transplantation. (B) Inflammatory response is shown for each treatment groups at 2 and 8 weeks after cell transplantation. (C) Cell survival is shown for each treatment groups at 2 and 8 weeks after cell transplantation. Abbreviations: MBP=myelin basic protein; IBA-1=ionized calcium-binding adapter molecule; iPSC-GEPs=induced pluripotent stem cells glial enriched progenitor cells.
Figure 11:
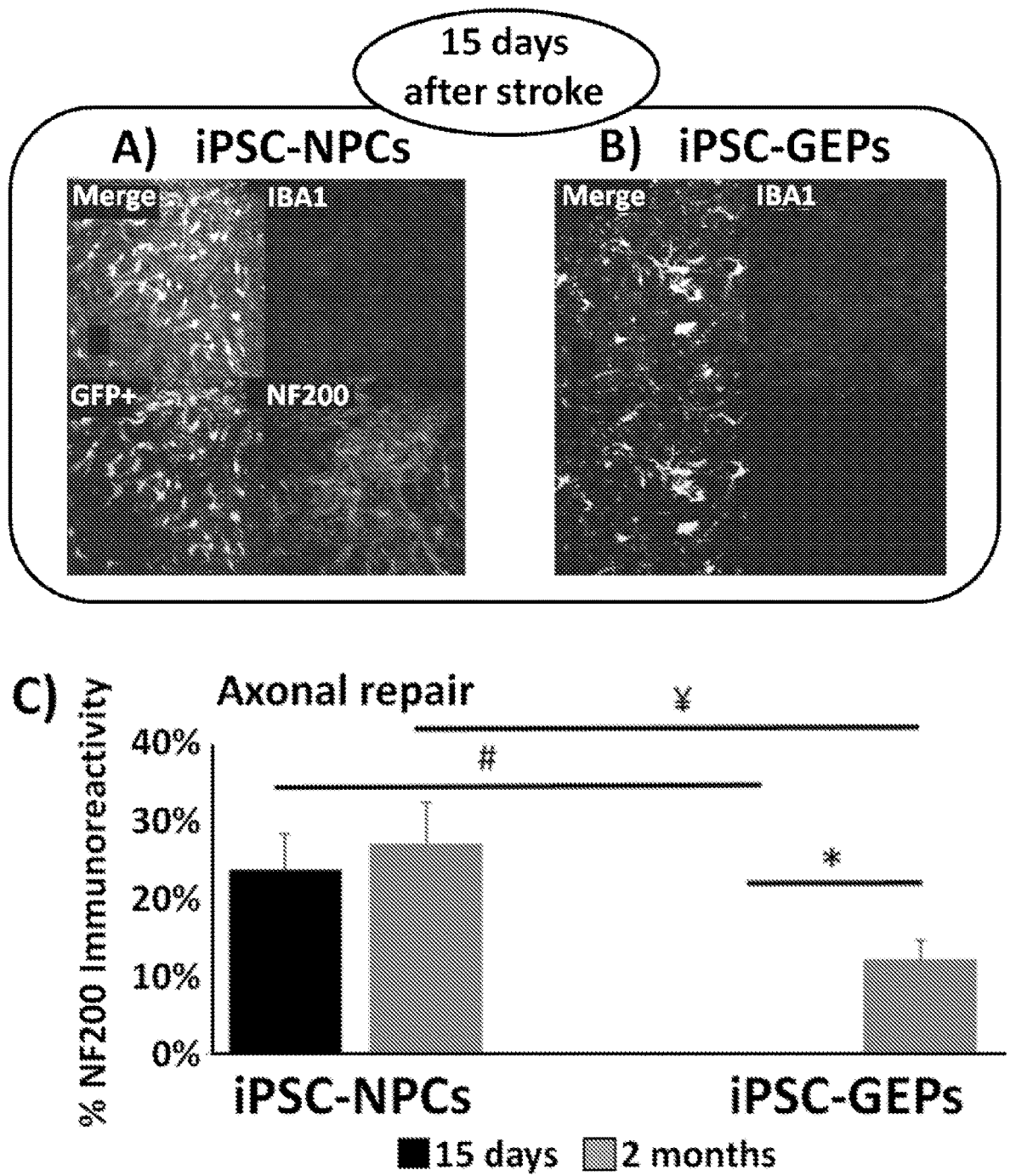
FIG. 11, panels A-C, shows representative fluorescent photomicrographs of iPSC-NPCs or iPSC-GEPs location, activated microglia/immune cells and axonal repair in the mouse brain following stroke injury. Image panels show fluorescent immunostaining of GFP+ cells (green), activated microglia/immune cells (IBA-1, blue) and NF200 (purple) 2 and 8 weeks after stroke injury following iPSC-NPCs or iPSC-GEPs transplantation. In panel A, panel 1 (left top) depicts the merged fluorescent image for GFP+, NF200 and IBA1, panel 2 (right top) depicts IBA-1 alone, panel 3 (left bottom) depicts GFP+ alone, and panel 4 (right bottom) depicts NF200 alone after 2 weeks of IPS-NPCs transplantation. In panel B, panel 1 (left top) depicts the merged fluorescent image for GFP+, NF200 and IBA1, panel 2 (right top) depicts IBA-1 alone, panel 3 (left bottom) depicts GFP+ alone, and panel 4 (right bottom) depicts NF200 alone after 2 weeks of IPS-GEPs transplantation. Panel C shows quantification of axonal repair in the mouse bran following stroke injury and iPSC-NPCs or iPSC-GEPs transplantation for each treatment groups at 2 weeks after cell transplantation. Magnification=600×. Abbreviations: NF200=neurofilament 200; MBP=myelin basic protein; IBA-1=ionized calcium-binding adapter molecule; iPSC-GEPs=induced pluripotent stem cells glial enriched progenitor cells.
Figure 12:
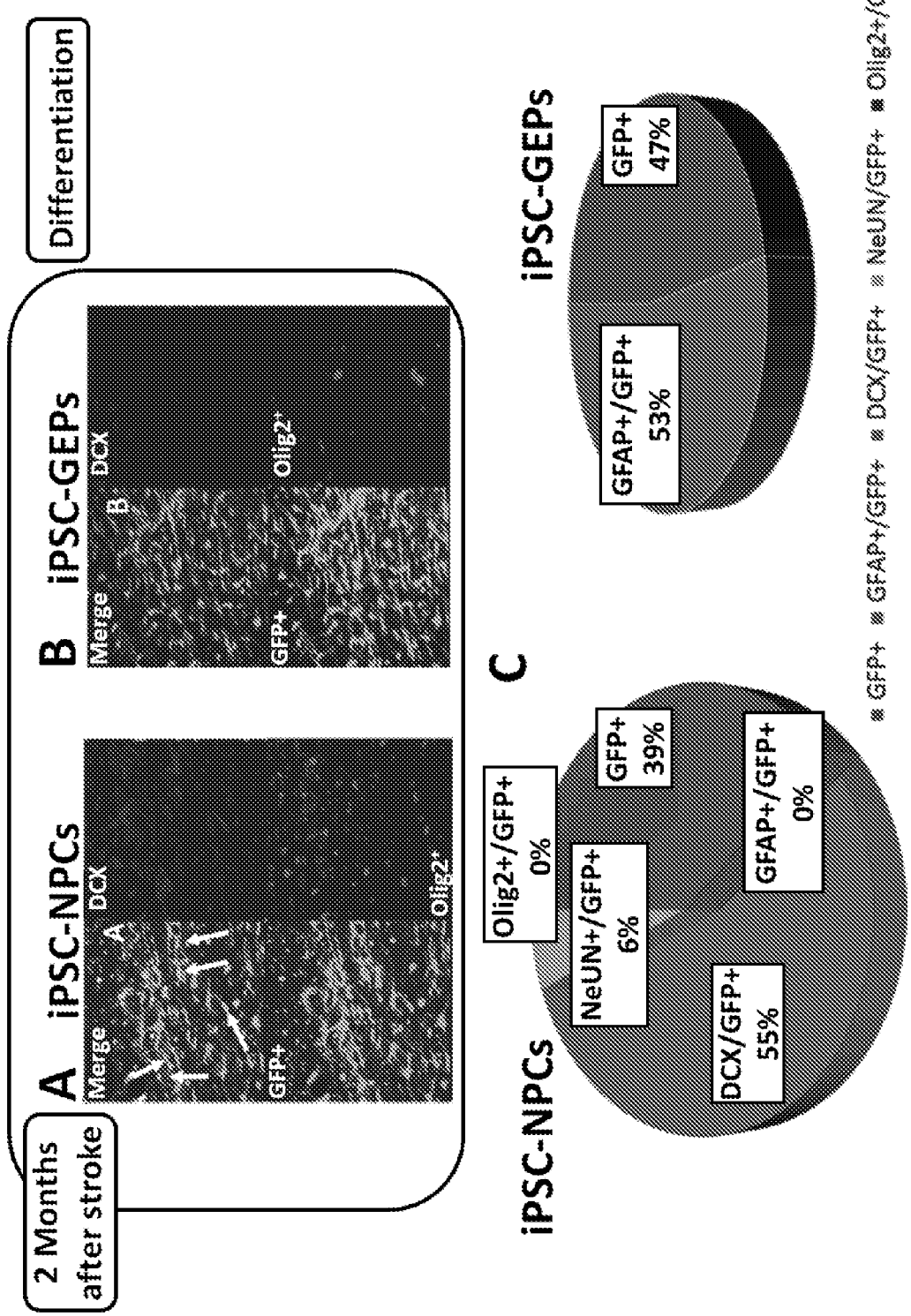
FIG. 12, panels A-C, shows representative fluorescent photomicrographs of iPSC-NPCs or iPSC-GEPs location, and cell differentiation in the mouse brain following stroke injury. Image panels show fluorescent immunostaining of GFP+ cells (green), inmature neurons (DCx, blue) and oligodendrocytes (OLIG2, red) 8 weeks after stroke injury following iPSC-NPCs or iPSC-GEPs transplantation. In panel A, panel 1 (left top) depicts the merged fluorescent image for GFP+, DCx and OLIG2, panel 2 (right top) depicts OLIG2 alone, panel 3 (left bottom) depicts GFP+ alone, and panel 4 (right bottom) depicts DCx alone after 8 weeks of IPS-NPCs transplantation. In panel B, panel 1 (left top) depicts the merged fluorescent image for GFP+, DCx and OLIG2, panel 2 (right top) depicts DCx alone, panel 3 (left bottom) depicts GFP+ alone, and panel 4 (right bottom) depicts OLIG2 alone after 8 weeks of IPS-GEPs transplantation. Panel C shows quantification of cell differentiation in the mouse bran following stroke injury and iPSC-NPCs or iPSC-GEPs transplantation for each treatment groups at 8 weeks after cell transplantation. Magnification=600×. Abbreviations: DCx=Doublecortin; iPSC-GEPs=induced pluripotent stem cells glial enriched progenitor cells.
Figure 13:
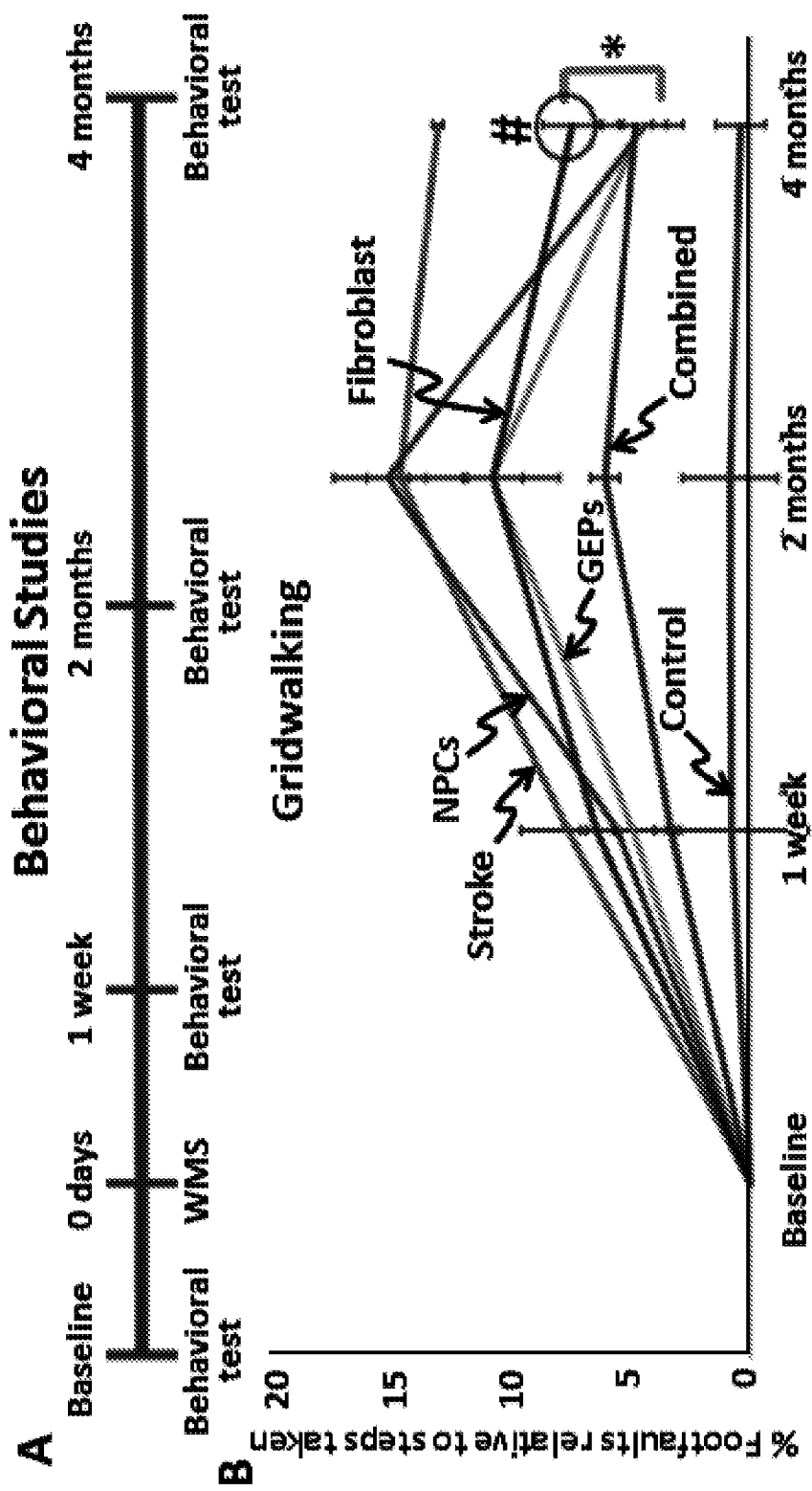
FIG. 13 panel A, shows the experimental timeline of Study 2 testing the effects of iPSC-NPCs and iPSC-GEPS on functional recovery and white matter sparing in a mouse model of white matter stroke. Key time points in the experimental design are shown, including cell transplantation 7 days post-stroke and monthly behavior testing. Panel B shows iPSC-NPCs or iPSC-GEPs transplantation into the lesion site improves performance of stroke-injured mice in the gridwalking test. Mean performance in the gridwalking test (shown as % foot faults) is shown for each treatment group as a function of time (post-stroke). One week post-stroke corresponds to the day prior to cell transplantation. Asterisk and hashtag indicate significance relative to the stroke group using two-way ANOVA with Tukey's HSD post-hoc analysis ($p<0.05$). At 4 months post-stroke, all stroke-injured groups with cell transplanted (iPSC-NPCs, iPSC-GEPs, iPSC-fibroblast and combined treatment) were significantly different from stroke, injured animals, indicating sustained de motor recovery. At the same time point, only the stroke+ iPSC-fibroblast was significantly different from the other treatments groups, indicating less motor recovery after the transplantation. Treatment group labels: Control=uninjured, non-transplanted; stroke=stroke alone; stroke+ iPSC-NPCs=stroke injury+100,000 iPSC-NPCs cells transplanted; stroke+ iPSC-GEPs=stroke injury+100,000 iPSC-GEPs; stroke+ iPSC-fibroblast=stroke injury+100,000 iPSC-fibroblast; stroke+combined treatment=stroke injury+50,000 iPSC-NPCs and 50,000 iPSC-GEPs.
Figure 14:
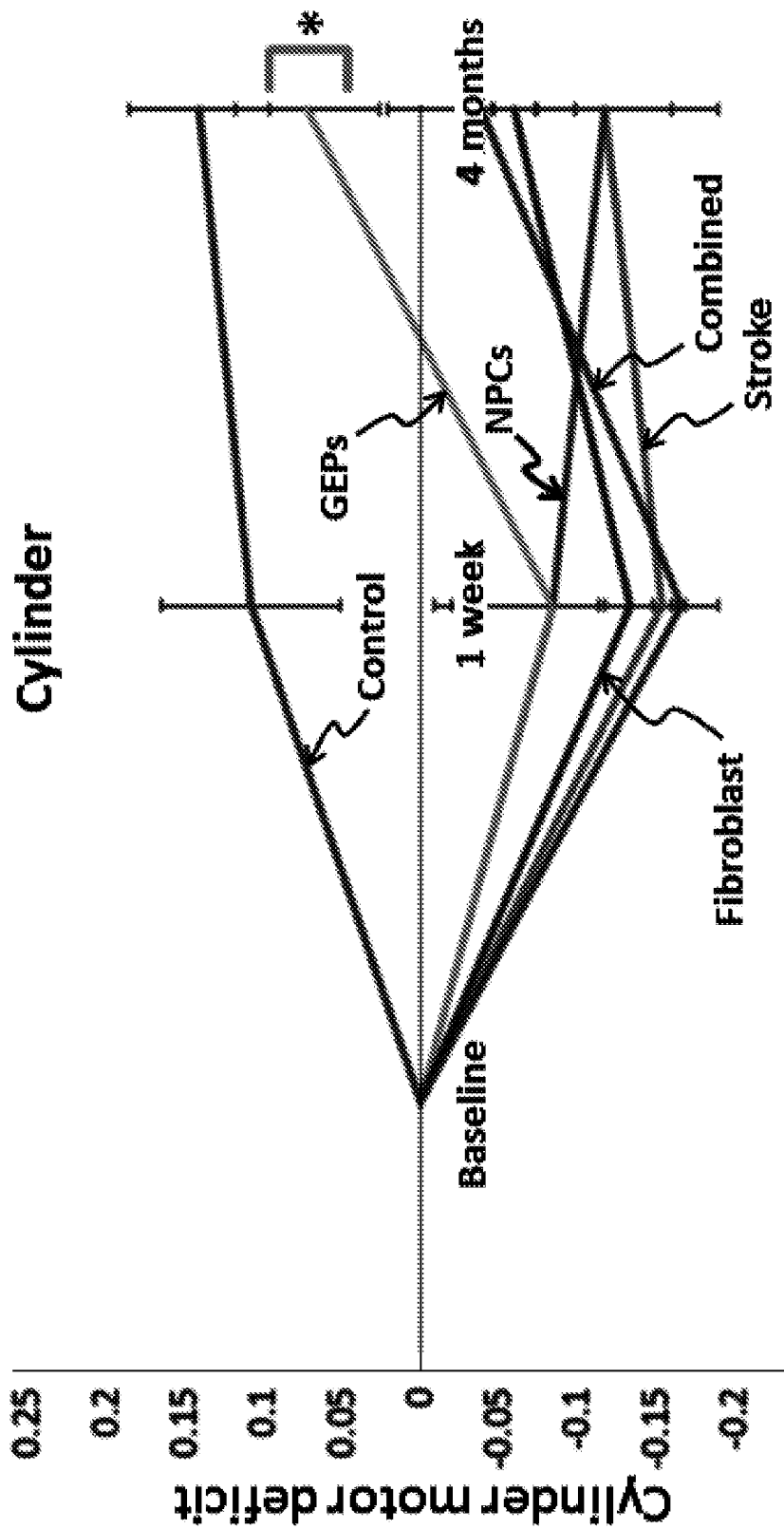
FIG. 14 shows iPSC-NPCs or iPSC-GEPs transplantation into the lesion site improves performance of stroke-injured mice in the cylinder test. Mean performance in the cylinder test (shown as motor deficit relative to pre-injury baseline) is shown for each treatment group as a function of time (post-stroke). One week post-stroke corresponds to the day prior to AST-OPC1 transplantation. Asterisk indicates significance relative to the the stroke alone group using two-way ANOVA with Tukey's HSD post-hoc analysis ($p<0.05$). One week post-stroke corresponds to the day prior to cell transplantation. Asterisk and hashtag indicate significance relative to the stroke group using two-way ANOVA with Tukey's HSD post-hoc analysis ($p<0.05$). At 4 months post-stroke, only the groups stroke+ iPSC-GEPs was significantly difference from stroke alone group, indicating the best motor recovery between the different treatments. Treatment group labels: Control=uninjured, non-transplanted; stroke=stroke alone; stroke+ iPSC-NPCs=stroke injury+100,000 iPSC-NPCs cells transplanted; stroke+ iPSC-GEPs=stroke injury+100,000 iPSC-GEPs; stroke+ iPSC-fibroblast=stroke injury+100,000 iPSC-fibroblast; stroke+ combined treatment=stroke injury+50,000 iPSC-NPCs and 50,000 iPSC-GEPs.

A previously established mouse model of subcortical white matter stroke (Sozmen et al. (2009) *J. Neurosci* Meth. 180(2): 261; Hinman et al. (2013) *Stroke* 44(1): 182) that mimics the large white matter lesions seen in moderate to advanced human white matter ischemia or vascular dementia was used. Briefly, to induce focal ischemic lesions, N5-(1-iminoethyl)-L-ornithine, dihydrochloride (L-Nio, Calbiochem), was injected at three stereotactic coordinates directly into the corpus callosum of each mouse brain, as illustrated in FIG. 2.

Production of iPS-GEPS cDNAs for OCT4, SOX2, C-MYC, NANOG, KLF4, and GFP were cloned into the retroviral pMX vector and separately transfected into Phoenix Ampho Cells (Orbigen) by using Fugene (Roche). Viral supernatants were harvested 3 days later, combined, and used to infect human neonatal dermal fibroblasts (NHDF1; Lonza) in DMEM with 10% FBS, nonessential amino acids, L-glutamine, and penicillin-streptomycin. A second round of infection was performed at day 3, and the transfection efficiency of each virus as extrapolated from that of GFP in the viral mix was 15-20%, suggesting that nearly 100% of cells received at least one virus.

Four days later, cells were passaged onto irradiated murine embryonic fibroblasts (MEFs). Human induced PSCs (hiPSCs) were cultured as described previously (Patterson et al., 2012) in accordance with UCLA Embryonic Stem Cell Research Oversight committee. Feeder-free PSCs were maintained with mTeSRT (Stem Cell Technologies) and passaged mechanically using StemPro EZPassage Tool (Invitrogen). Neural rosette derivation, NPC purification, and further differentiation to neurons and glia were performed as described (Patterson et al., 2012). Briefly, rosettes were generated by growing PSCs for at least 7 days in Dulbecco's modified Eagle's medium (DMEM)/F12 with N2 and B27 supplements (Invitrogen), 20 ng/ml basic fibroblast growth factor (FGF) (R&D Systems), 1 µM retinoic acid (RA) (Sigma), and 1 pM Sonic Hedgehog Agonist (Calbiochem). Once rosettes were picked, they were then cultured in NPC medium containing DMEM/F12, N2 and B27, 20 ng/ml basic FGF, and 500 ng/ml epidermal growth factor (EGF) (GIBCO). DFX (Sigma) (100 to 200 µM) were added at the NPC stage for 4 to 6 days, and their concentrations were adjusted for each cell line individually. NPCs were treated with or without 100 µM DFX for 3-5 days, and then returned to standard conditions until trypsinized for injection.

iPS-GEPs Transplantation in NSG Mice

Cells were stereotaxically transplanted 7 days after stroke. The temperature of the mice were monitored and maintained at 36.5-37.5° C. using a rectal probe and heating pad. A Hamilton syringe was filled with iPS-GEPs secured onto the stereotaxic arm and connected to a pressure pump. A second incision was made at AP +0.14, ML +3, DV −1.32. Two 0.45 pi injections of iPs-GEPs were given (100,000 cells/microL) at an angle of 36°. The needle was left in situ for 2 minutes after the first injection, and for 4 minutes after the second injection.

Brain Tissue Processing for Immunofluorescence, and MRI.
Immunofluorescence

After the post-surgery survival period (15 days and 2 months), each mouse was given an overdose of isoflurane and perfused transcardially with 0.1 M phosphate buffered saline followed by 4% paraformaldehyde. The brains were removed, postfixed overnight in 4% paraformaldehyde and cryoprotected for 2 days in 30% sucrose. Subsequently brains were removed and frozen. Brain tissue was sectioned into 40 pm sections 200 pm apart using a cryostat (Leica CM 0530).

Immunostaining for microglial/macrophage marker IBA-1, the neuronal marker NF200, the astrocyte marker GFAP, the pan-oligodendrocyte marker Olig2, the mature oligodendrocyte maker MBP and the immature neuronal marker DCx was done by blocking in 5% normal donkey serum for 1 hour at room temperature, incubation in primary antibody overnight at 4° C., incubation in secondary antibody for 1 hour at room temperature, mounting sections onto subbed slides and air drying. Mounted sections were then dehydrated, in ascending concentrations of alcohol and xylene, and cover slipped with DPX.

Primary antibodies were: Rabbit anti-lba-1 (1:500, Wako Chemicals), rabbit anti-NF200 (1:500, Sigma), rat anti-myelin basic protein (MBP, T.500, Millipore), rabbit anti-Olig2 (1:500, Millipore), rat anti-GFAP (1:500, Millipore), goat anti-doublecortin (1:500, Santa Cruz Biotechnologies). All secondary antibodies were donkey F(ab')2 fragments conjugated to Cy2 (cyan) or Cy3 (yellow) (Jackson Immunoresearch) dyes and were used at a dilution of 1:1000.

Confocal Images

High-resolution confocal images in Z-stacks were acquired (Nikon C2 confocal system). Area measurements of the infarct core, IBA-1, GFAP, DCX, Olig2 and GFP positive cells were stereologically quantified using the optical fractionator probe and neuroanatomical quantification software (Stereoinvestigator, MBF Bioscience). White matter axonal projections stained with NF200 and MBP were quantified with intensity profiles (ImageJ, NIH).

MRI

Mice were anesthetized and placed in a Bruker 7T small animal MRI (Bruker Biospin, Switzerland). MRI imaging was performed on days 0, 7 and 6 months after stroke. Respiratory rate was monitored throughout the procedure and body temperature was maintained at 37±0.5° C. A T2-weighted image set was acquired: rapid acquisition relaxation enhancement factor 8, repetition time 5300 ms, echo time 15.00 ms with an in-plane resolution of 0.0156_0.0156_0.50 mm with 13 contiguous slices.

Tractography, diffusion tensor data (DTI) were acquired at 0, 7 and 6 months after treatment with a spin echo single shot echo planar imaging (EPI) pulse sequence using the following parameters: TR/TE: 5000/35 ms; a signal average of 10, a 30 noncolinear diffusion gradient scheme with diffusion weighting of b=1000 s/mm2 and b=0 s/mm2, and field of view 3.5×3.5 cm. The data was acquired using 30 directions with a single shot EPI sequence on a 96×96 matrix, and zero-filled k-space to construct a 128×128 image matrix. The images were obtained with medInria, a multi-platform medical image processing and visualization software. DTI tractography data was performed in the lesion zone using n=6 animals per group. Zoomed lesion site 3D views of DTI tractography images are represented using ParaView 4.1.0 software.

EXAMPLES

The following examples are offered to illustrate, but not to limit the claimed invention.

Example 1

Derivation and Characterization of iPS-GEP

The iPS-GEPs were extensively characterized in Xie et al. (2014) *Stem Cell Reports* 3: 743-757). They were shown to continue to express all the typical markers of human NPCs, namely SOX2, PAX6, SOX1, NESTIN etc., but also showed a distinct pattern of markers of neural development (Dlx, Fox, Ngn families of transcription factors).

When subjected to continued terminal differentiation by growth factor withdrawal, iPS-GEPs showed a dramatically higher propensity to produce cells of the astrocyte lineage as measured by GFAP and S100B staining. Despite the fact that iPS-GEPs only differ from standard NPCs by 3-5 days of DFX treatment, iPS-GEPs are permanently more astrocytic in their differentiation, both in vitro and in vivo after transplantation. The gene expression pattern of DFX-treated iPS-GEPs differs significantly from iPS-NPCs, and includes the differential expression of several growth factors that may play a role in neural repair (Table 1).

TABLE 1

Differentially expressed growth factors in iPS-GEP as compared to iPS-NPCs. iPS cells were exposed to deferoxamine for 2-3 days as described to induce iPS-GEPs or kept in standard NPC culture medium as described in EXAMPLE 1 and Materials and Methods. After 5 days, total RNA was isolated from cell types and used to probe whole genome microarrays. Genes corresponding to secreted growth factors were studied that had a fold expression of at least 1.54 fold higher in iPS-GEPs compared to iPS-NPCs. GDF15 (Growth Differentiation Factor 15) has the highest expression level in iPS-GEPs.

| Growth Factor | Full Name | Fold Increase vs. ISPS-NPCs |
|---|---|---|
| KITLG | Kit ligand/stem cell factor | 1.71 |
| GDNF | Glial cell-derived neurotrophic factor | 1.68 |
| GDF15 | Growth differentiation factor 15 | 4.52 |
| FGF11 | Fibroblast growth factor 11 | 1.75 |
| GDF3 | Growth differentiation factor 3 | 2.01 |
| GPI | Glucose-6-phosphate isomerase/neuroleukin | 1.66 |
| TGFA | Transforming growth factor alpha | 1.83 |
| VEGFA | Vascular endothelial growth factor alpha | 3.47 |

Example 2

Study 1—iPS-GEP Transplantation in a NSG Murine Model of White Matter Stroke

To allow for full study of the iPS-GEP xenograft transplant, a previously established mouse model of subcortical white matter stroke (Sozmen et al. (2009) *J. Neurosci. Meth.* 180(2): 261; Hinman et al. (2013) *Stroke* 44(1): 182) that mimics the large white matter lesions seen in moderate to advanced human white matter ischemia or vascular dementia was adapted to the immunodeficient NSG mouse (Shultz et al. (2007) *Nat. Rev. Immunol.* 7(20):118; jaxmice.jax.org/nod-scid-gamma). Briefly, to induce focal ischemic lesions, N5-(1-iminoethyl)-L-ornithine, dihydrochloride (L-Nio, Calbiochem), was injected at three stereotactic coordinates directly into the corpus callosum of each mouse brain, as illustrated in FIG. 2. The experimental timeline is illustrated in FIG. 1. The study goals and parameters are described in detail in Table 2. Brain tissue was processed 15 days post stroke induction (i.e. two-weeks post iPSC-GEP or sham injection) and fluorescent immunostaining performed to determine the extent of myelination, axonal loss, astrocyte activation, microglial/macrophage responses and oligodendrocyte responses. Representative results are depicted in FIGS. 1-14.

TABLE 2

Study goals and parameters. Goals: Establish experience in transplantation and determine early survival and migration characteristics of iPS-GEPs in NSG white matter stroke; to understand the effects of the stroke environment on survival and migration.

| Group | Group Description |
|---|---|
| 1 | Stroke |
| 2 | Stroke + iPS-GEPs in peri-infarct white matter |
| 3 | Stroke + iPS-NPCs peri-infarct white matter |
| 4 | Control + iPS-GEPs + iPS-NPCs in peri-infarct white matter |

Sample size: 5 mice per group. Cell transplantation: 7 days after stroke, 100,000 cells/mouse in a single 1 pL injection delivered inside the infarct or immediately adjacent to infarct (peri- infarct) Survival: 2 weeks and 2 months post cell injection Example 3

Study 2—Efficacy Study of iPS-GEPs for Behavioral Recovery

NSG mouse model of WMS as described in Example 2 was used to assess the effect of iPSC-GEP transplantation on behavioral recovery and whether iPSC-GEP transplantation improves white matter preservation based on MRI and ex vivo histochemical staining. The experimental timeline is illustrated in FIG. 1. The behavioral tests (cylinder test and grid walking) are described in detail in infra. Representative results are depicted in the Figures.

TABLE 3

Goals: Determine if change iPS-GEPs transplantation at 7 days after white matter stroke promotes neurological recovery based on behavior testing; determine whether change this to iPS-GEP transplantation improves white matter preservation based on MRI and ex vivo histochemical staining.

| Group | Description |
|---|---|
| 1 | Control (sham surgery) |
| 2 | Stroke alone |
| 3 | Stroke + iPS-fibroblast |
| 4 | Stroke + iPS-GEPs |
| 5 | Stroke + iPS-neuronal precursor cells (NPCs) |
| 6 | Stroke + iPS-GEPs + iPS-NPCs, |

Sample Size: 12 mice per group Animals: 72 mice total.
Cell transplantation: 7 days after stroke, 100,000 cells/mouse Behavior:

To measure proximal and distal motor control of the impaired forelimb, as well as hind limb function in gait. These test natural movements in the mouse.

Testing time points: pre-stroke (baseline), 7 days after stroke (before cell transplantation), 2 and 4 months.

MRI: Pre-stroke, one month after stroke.

Histology: Upon completion of behavior testing, brains are processed for histological evaluations of infarct size, endogenous brain repair and inflammation, and transplanted cell survival/phenotype.

Cylinder test. Exploratory behavior in mice provides a possibility to investigate the neural basis of spatial and motor behavior, which can be used as an assay of brain function. The cylinder test provides a way to evaluate a rodent's spontaneous forelimb use and has been used in a number of motor system injury models of stroke. To evaluate forelimb deficits, the animal is placed in a transparent Plexiglas cylinder and observed. Mice actively explore vertical surfaces by rearing up on their hind limbs and exploring the surface with their forelimbs and vibrissae. When assessing behavior in the cylinder, the number of independent wall placements observed for the right forelimb, left forelimb and both forelimbs simultaneously are recorded. Animals with unilateral brain damage will display an asymmetry in forelimb use during vertical exploration.

The cylinder task has been found to be objective, easy to use and score, sensitive to chronic deficits that others fail to detect and have high inter-rater reliability.

Grid walking test. The grid walking task, often referred to as the foot fault task, is a relatively simple way to assess motor impairments of limb functioning (most commonly hind limbs, but forelimbs have been evaluated as well) and placing deficits during locomotion in rodents. This task has been found to objectively demonstrate motor coordination deficits and rehabilitation effects after stroke. An animal is placed on an elevated, leveled grid with openings. Animals without brain damage will typically place their paws precisely on the wire frame—to hold themselves while moving along the grid. Each time a paw slips through an open grid, a "foot fault" is recorded. The number of both contra- and ipsilateral faults for each limb is compared to the total number of steps taken and then scored using a foot fault index. Intact animals will generally demonstrate few to no foot faults, and when faults occur, they do so symmetrically. Ischemic animals typically make significantly more contralateral foot faults than intact animals. The foot fault test has been shown to be a sensitive indicator for detecting impairments of sensorimotor function after ischemia in rodents.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of improving recovery of a human after a subcortical white matter stroke (WMS), said method comprising
   (i) culturing human induced pluripotent stem cells (hiPSCs) in a culture medium containing basic fibroblast growth factor (FGF), retinoic acid (RA) and sonic hedgehog agonist to produce neural rosette that is then cultured in a neural progenitor cell (NPC) medium containing epidermal growth factor (EGF), basic fibroblast growth factor (bFGF) to produce neural progenitor cells (NPCs);
   (ii) culturing the NPCs of step (i) in said NPC medium containing 100 µM to 200 µM of deferoxamine (DFX) for 3 to 5 days to obtain glial-enriched progenitor cells (GEPs), wherein the GEPs exhibit an elevated expression of growth differentiation factor 15 (GDF15), growth differentiation factor 3 (GDF3) and vascular endothelial growth factor alpha (VEGFA) as compared to the NPC that are not treated with DFX; and wherein said GEPs differentiation potential is restricted to astrocytes expressing GFAP and S100B, and
   iii) directly administering a therapeutically effective amount of the GEPs into or adjacent to at about 0.05 mm to about 3 mm from the infarct core in the brain of said human,
   wherein said GEPs are administered during the early subacute time period after the white matter stroke; and
   wherein said administration promotes neurological recovery and improves white matter preservation after the subcortical WMS.

2. The method of claim 1, wherein said glial-enriched progenitor cells are administered directly into the infract core.

3. The method of claim 1, wherein said glial-enriched progenitor cells are administered using a depot delivery system comprising a hydrogel.

* * * * *